(12) United States Patent
Beaulieu

(10) Patent No.: US 12,134,052 B2
(45) Date of Patent: Nov. 5, 2024

(54) FILTER ASSEMBLY FOR GAS TURBINE ENGINE

(71) Applicant: PRATT & WHITNEY CANADA CORP., Longueuil (CA)

(72) Inventor: Rose Beaulieu, Montréal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 799 days.

(21) Appl. No.: 17/226,645

(22) Filed: Apr. 9, 2021

(65) Prior Publication Data

US 2021/0236969 A1 Aug. 5, 2021

Related U.S. Application Data

(63) Continuation-in-part of application No. 16/778,443, filed on Jan. 31, 2020, now Pat. No. 11,369,908.

(51) Int. Cl.
| | | |
|---|---|---|
| *B01D 35/30* | (2006.01) | |
| *B01D 29/33* | (2006.01) | |
| *F23R 3/40* | (2006.01) | |

(52) U.S. Cl.
CPC ............ *B01D 35/30* (2013.01); *B01D 29/33* (2013.01); *F23R 3/40* (2013.01); *B01D 2201/303* (2013.01); *B01D 2201/347* (2013.01); *B01D 2201/4076* (2013.01)

(58) Field of Classification Search
CPC .. B01D 35/30; B01D 29/33; B01D 2201/303; B01D 2201/347; B01D 2201/4076
See application file for complete search history.

(56) References Cited

U.S. PATENT DOCUMENTS

| | | |
|---|---|---|
| 2,463,800 A | 3/1949 | Pate |
| 4,322,231 A | 3/1982 | Hilzendeger et al. |
| 4,536,200 A | 8/1985 | Reist |
| 4,707,165 A | 11/1987 | Tauber et al. |
| 5,531,129 A | 7/1996 | Thornton et al. |
| 6,149,703 A | 11/2000 | Parker |
| 6,217,755 B1 | 4/2001 | Stifelman et al. |

(Continued)

FOREIGN PATENT DOCUMENTS

| | | |
|---|---|---|
| DE | 102015208426 A1 | 11/2016 |
| EP | 1304244 A2 | 4/2003 |

(Continued)

*Primary Examiner* — Robert Clemente
(74) *Attorney, Agent, or Firm* — NORTON ROSE FULBRIGHT CANADA LLP

(57) ABSTRACT

A filter assembly for an engine, has: a housing having a longitudinal axis and defining an internal volume, the housing having an open end and defining an oil inlet and an oil outlet, the internal volume having a first zone and a second zone, the first zone in fluid communication with the oil inlet, the second zone in fluid communication with the oil outlet; a cartridge assembly having a filter cartridge, and a cover sealingly engageable to the housing to close the open end of the housing, the filter cartridge axially locked in the housing by the cover, the cover removably securable to the housing; and a sealing member between the housing and the cartridge assembly, the sealing member separating the first zone from the second zone such that the first zone communicates with the second zone through the filter cartridge.

19 Claims, 13 Drawing Sheets

(56) References Cited

U.S. PATENT DOCUMENTS

| | | |
|---|---|---|
| 6,398,833 B1 | 6/2002 | Santerre et al. |
| 6,533,845 B2 | 3/2003 | Tokar et al. |
| 6,540,914 B1 | 4/2003 | Smith |
| 6,991,665 B1 | 1/2006 | Allen et al. |
| 7,396,376 B2 | 7/2008 | Schrage et al. |
| 8,114,196 B2 | 2/2012 | Lamee |
| 8,226,822 B2 | 7/2012 | Paradise |
| 8,357,219 B2 | 1/2013 | Boehrs et al. |
| 8,545,589 B2 | 10/2013 | Rocklitz et al. |
| 8,734,572 B2 | 5/2014 | Zhang et al. |
| 8,845,898 B2 | 9/2014 | DeDe et al. |
| 8,973,760 B2 | 3/2015 | Ries et al. |
| 9,308,483 B2 | 4/2016 | Jackson et al. |
| 9,446,333 B2 | 9/2016 | Vercammen |
| 9,782,702 B2 | 10/2017 | Carrion |
| 10,024,239 B2 | 7/2018 | Turcotte |
| 10,201,772 B2 | 2/2019 | Allott et al. |
| 10,247,102 B2 | 4/2019 | Dreher et al. |
| 10,337,600 B2 | 7/2019 | Ture |
| 10,512,865 B2 | 12/2019 | Eyers et al. |
| 2004/0164009 A1 | 4/2004 | Smith |
| 2005/0252848 A1 | 11/2005 | Miller |
| 2009/0071111 A1* | 3/2009 | Lundgren .............. F01M 13/04 55/385.4 |
| 2011/0277442 A1 | 11/2011 | Drobniak |
| 2012/0240535 A1 | 9/2012 | Mann et al. |
| 2019/0046907 A1 | 2/2019 | Willems |
| 2019/0345853 A1 | 11/2019 | Stachowiak |

FOREIGN PATENT DOCUMENTS

| | | |
|---|---|---|
| EP | 2451556 A1 | 5/2012 |
| WO | WO02/100511 A1 | 12/2002 |
| WO | WO03/082435 A1 | 10/2003 |
| WO | WO2008/030707 A1 | 3/2008 |
| WO | 2015153906 A2 | 10/2015 |
| WO | WO2017/050368 A1 | 3/2017 |
| WO | WO2017/050369 A1 | 3/2017 |

* cited by examiner

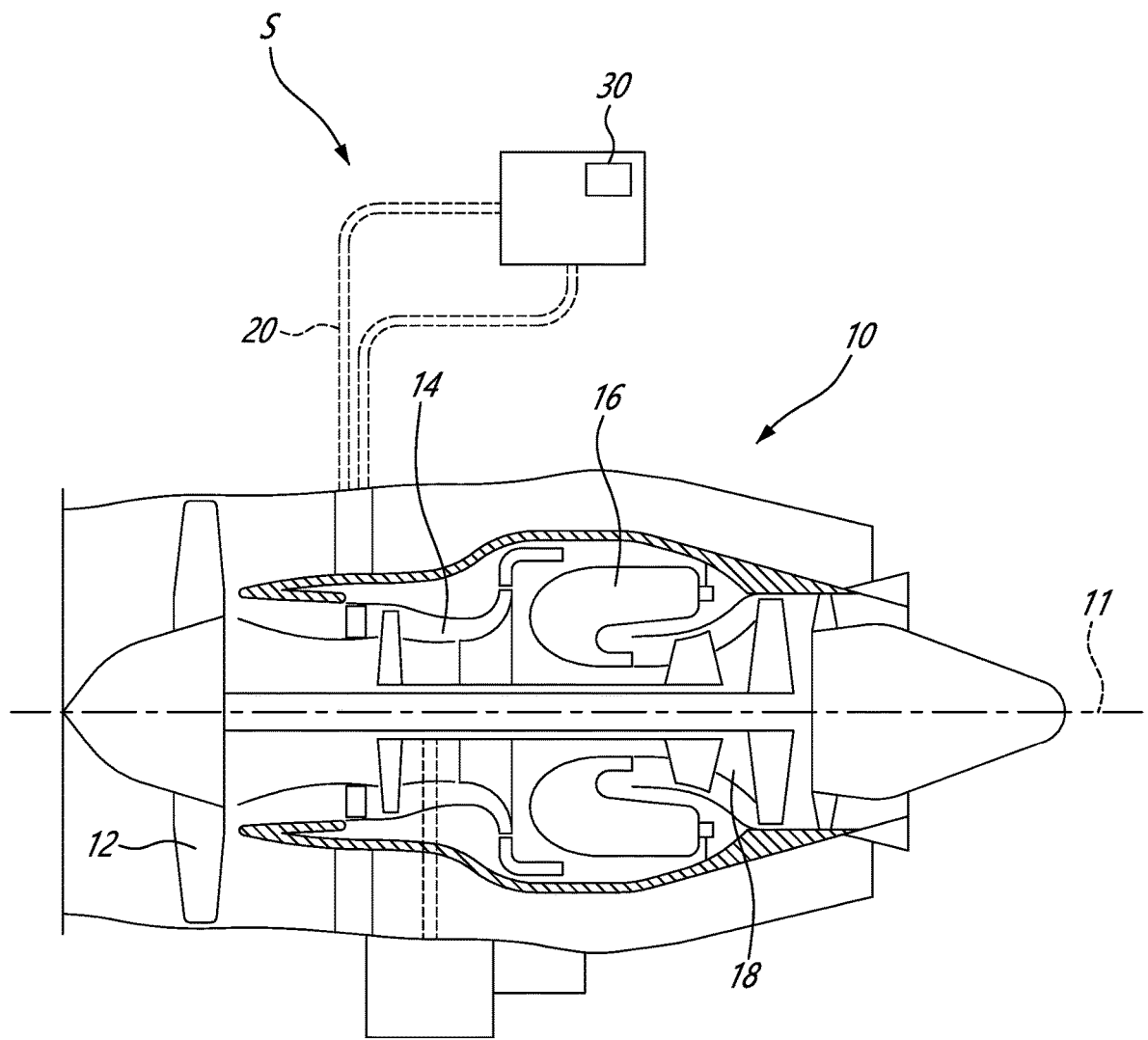

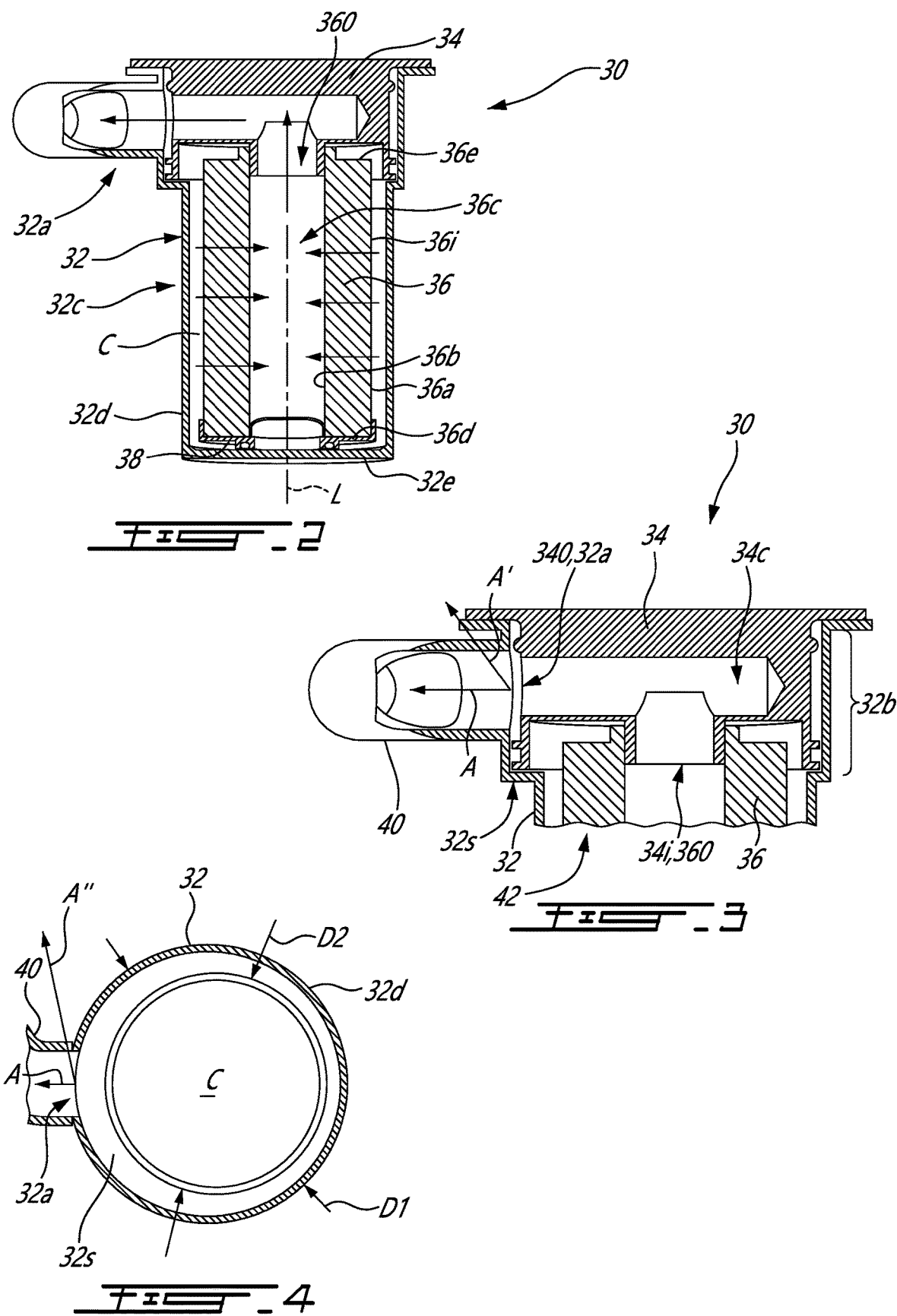

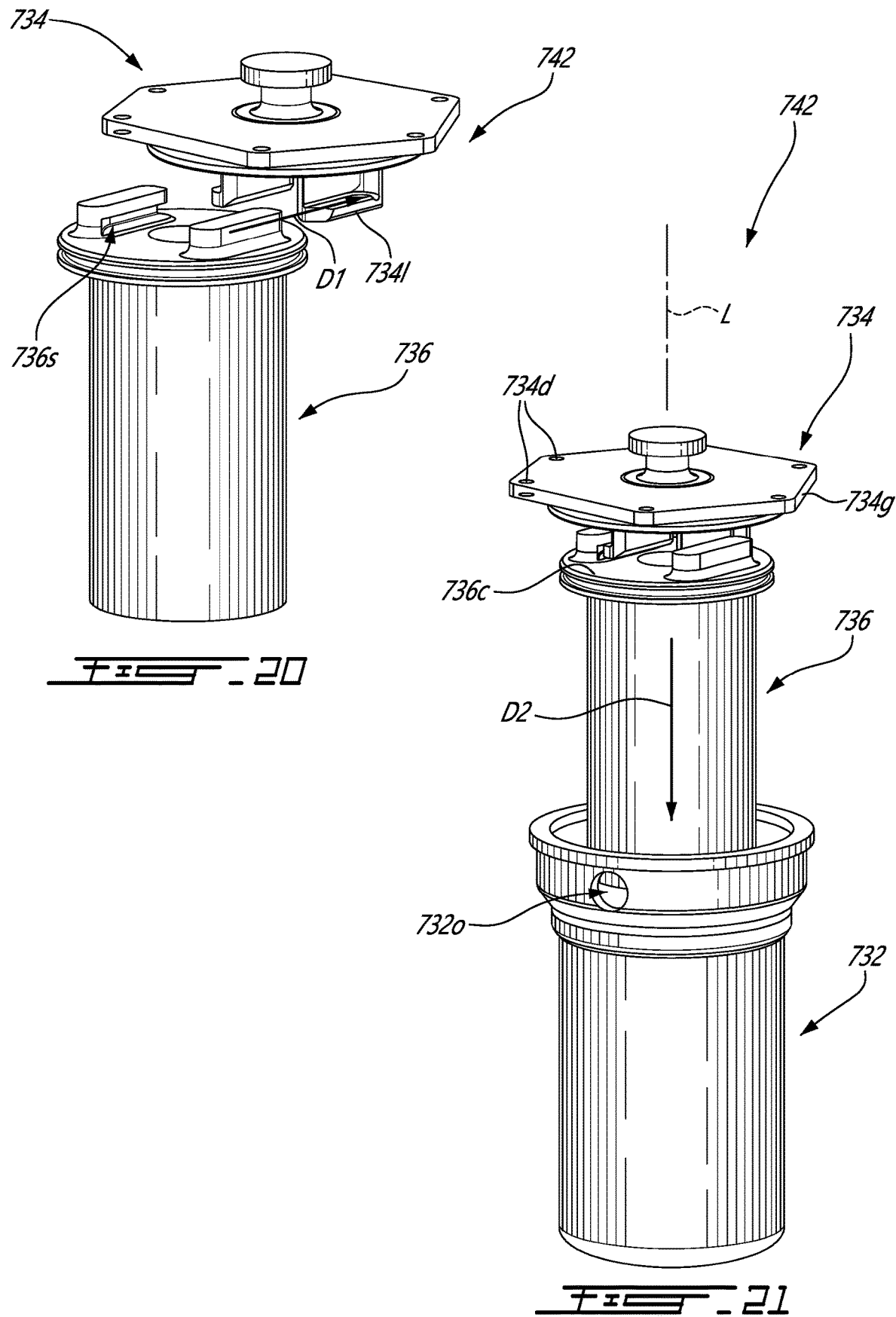

FILTER ASSEMBLY FOR GAS TURBINE ENGINE

CROSS-REFERENCE TO RELATED APPLICATION

This application is a continuation-in-part of U.S. application Ser. No. 16/778,443 filed on Jan. 31, 2020, the entire contents of which are incorporated by reference herein in their entirety.

TECHNICAL FIELD

The application relates generally to gas turbine engines and, more particularly, to filters used in such engines.

BACKGROUND OF THE ART

Gas turbine engines use lubricant to distribute heat, lubricate bearings, reduce friction, etc. This lubricant is circulated through the engine and can carry physical contaminants, such as carbon particles, metal particles, dirt, etc. Accordingly, lubricant is periodically passed through a lubricant filtration unit comprising one or more filters in order to remove at least a portion of the contaminants from the lubricant before the lubricant is circulated back into the engine.

SUMMARY

In one aspect, there is provided a filter assembly for an engine, comprising: a housing having a longitudinal axis and defining an internal volume, the housing having an open end, the housing defining an oil inlet and an oil outlet, the internal volume having a first zone and a second zone, the first zone in fluid communication with the oil inlet, the second zone in fluid communication with the oil outlet; a cartridge assembly having a filter cartridge extending into the internal volume, and a cover sealingly engageable to the housing to close the open end of the housing, the filter cartridge axially locked in the housing by the cover, the cover removably securable to the housing to allow replacement of the filter cartridge via the open end; and a sealing member between the housing and the cartridge assembly, the sealing member separating the first zone from the second zone such that the first zone communicates with the second zone through the filter cartridge.

In some embodiments, the filter cartridge includes an annular flange extending circumferentially around a filtering medium of the filter cartridge, the sealing member located between the annular flange and the housing.

In some embodiments, a distal end of the annular flange defines a groove, the sealing member received within the groove and biased against the housing.

In some embodiments, the annular flange and the filtering medium of the filter cartridge are non-concentric.

In some embodiments, a radial dimension of the annular flange relative to the longitudinal axis is maximal at a circumferential location relative to the longitudinal axis, the circumferential location registering with the oil outlet of the housing.

In some embodiments, the housing has a first housing section and a second housing section protruding axially from the first housing section, the second housing section ending at the open end, a first diameter of the first housing section less than a second diameter of the second housing section to define a shoulder between the first housing section and the second housing section.

In some embodiments, the first housing section and the second housing section are non-concentric, a radial dimension of the shoulder is maximal at the circumferential location.

In some embodiments, a locking engagement is defined between the cover and the filter cartridge to axially lock the cover to the filter cartridge, the locking engagement defined by a cooperation of a leg slidingly receivable within a slot, the leg defined by one of the cover and the filter cartridge, the slot defined by the other of the cover and the filter cartridge.

In some embodiments, the leg is movable within the slot along a direction normal to the longitudinal axis of the housing.

In some embodiments, the slot and the leg includes two slots and two legs parallel to each other, each of the two slots slidingly engageable within a respective one of the two slots.

In some embodiments, the two legs are located at distal ends of two webs protruding from the one of the cover and the filter cartridge along an axial direction relative to the longitudinal axis, the two legs being transverse to the two webs.

In some embodiments, the two slots are defined by two protrusions extending axially from the other of the cover and the filter cartridge relative to the longitudinal axis, and wherein the two legs extend transversally from the two webs in a direction normal to the longitudinal axis and away form one another, the two slots facing one another.

In some embodiments, a first stopper is located at an end of the slot and a second stopper at an end of the leg such that the cover is securable to the filter cartridge in a single circumferential orientation of the cover relative to the filter cartridge.

In some embodiments, the filter cartridge includes an annular flange extending circumferentially around a filtering medium of the filter cartridge, the sealing member located between the annular flange and the housing, wherein the annular flange and the filtering medium are non-concentric.

In some embodiments, the housing has two non-concentric sections of different diameters thereby defining a shoulder at an intersection between the two non-concentric sections, the cartridge assembly securable to the housing in a single circumferential orientation one relative to the other.

In some embodiments, the slot and the leg includes two slots and two legs parallel to each other, each of the two legs slidingly engageable within a respective one of the two slots, a spacing defined between the two legs, the spacing oriented toward the oil outlet of the housing when the cartridge assembly is received in the housing at the single circumferential orientation.

In another aspect, there is provided a filter cartridge for a filter assembly of an engine, the filter cartridge comprising: a filtering medium extending along a longitudinal axis; and an annular flange radially protruding from the filtering medium relative to the longitudinal axis, the annular flange extending circumferentially around the longitudinal axis, the annular flange defining a groove at a distal end of the annular flange relative to a radial distance from the longitudinal axis, the groove sized for receiving a sealing member in the groove.

In some embodiments, the filtering medium and the annular flange are non-concentric.

In some embodiments, a protrusion extends axially from the filtering medium relative to the longitudinal axis, the protrusion defining one of a leg and a slot sized to receive a correspondingly shaped element of a cover of the filter assembly.

In some embodiments, the filtering medium defines a central passage communicating with a space defined between two protrusions of the protrusion, the space registering with a circumferential location where a radial dimension of the annular flange is maximal.

DESCRIPTION OF THE DRAWINGS

Reference is now made to the accompanying figures in which:

FIG. 1 is a schematic cross sectional view of a gas turbine engine;

FIG. 2 is a cutaway view of a filter assembly for the gas turbine engine of FIG. 1 in accordance with one embodiment;

FIG. 3 is an enlarged view of a portion of FIG. 2;

FIG. 4 is a top view of a housing of the filter assembly of FIG. 2;

FIG. 20 is a three dimensional view illustrating a first step of assembling the cartridge of FIG. 19 to the cover of FIG. 18; and FIG. 21 is a three dimensional view illustrating a second step of assembling the cartridge of FIG. 19 to the cover of FIG. 18.

DETAILED DESCRIPTION

Figure 5:
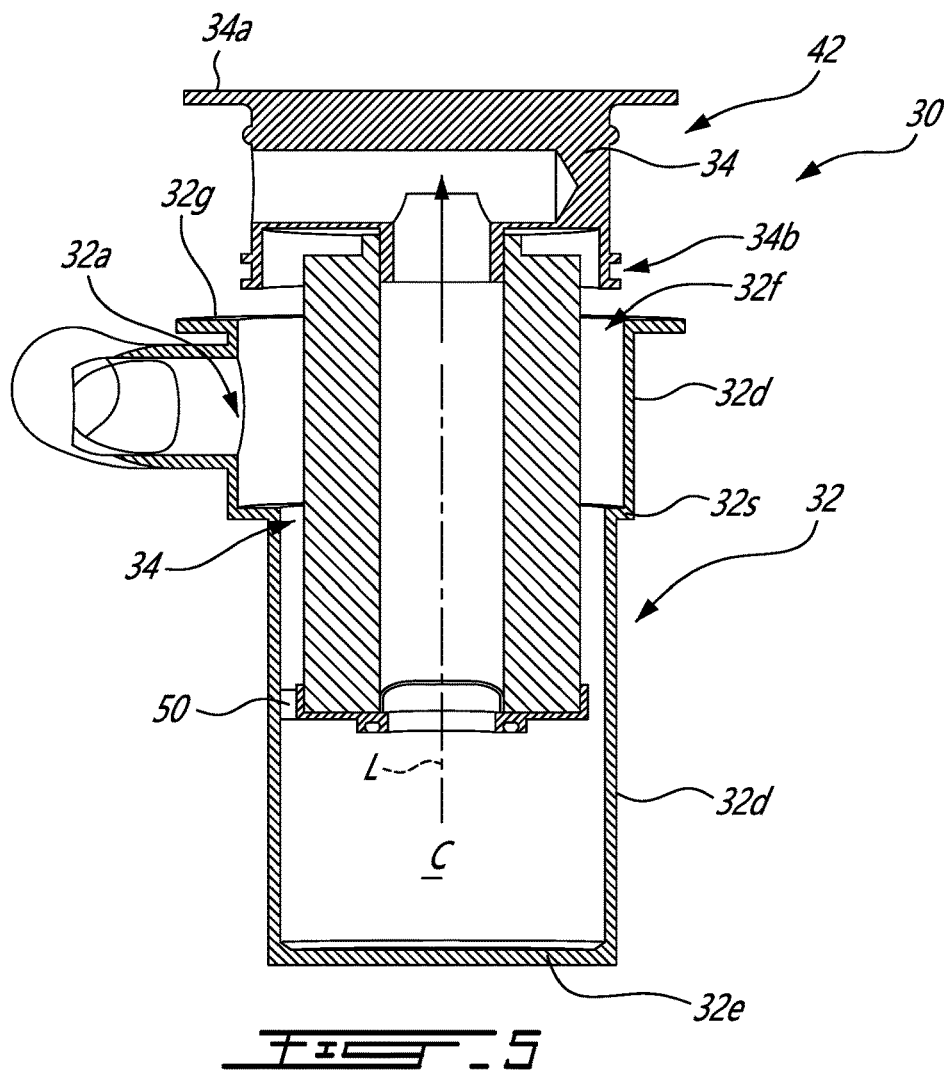
FIG. 5 is a cutaway partially exploded view of the filter assembly of FIG. 2.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10.

The gas turbine engine 10 may include a lubrication system S that may include a pump (not shown), lubrication conduits 20, a lubricant reservoir (not shown), and a filter assembly 30. The lubrication system S may also include additional components such as valve(s) (not shown), heat exchangers, etc. The lubricant reservoir may be in fluid flow communication with one or more components of the gas turbine engine 10 in need of lubrication, such as, for instance, bearing cavity(ies), gearbox(es), and so on. The pump induces a flow of the lubricant from the lubricant reservoir, to the one or more components of the gas turbine engine 10 in need of lubrication, back from the one or more components toward the reservoir and through the filter assembly 30. The filter assembly 30 is used to remove contaminants from the lubricant before flowing the lubricant towards the one or more components.

In some configurations, a lubricant filter assembly, which includes a filter cartridge and a housing containing the filter cartridge, are secured to a gas turbine engine in such a way that replacement of the filter cartridge includes pulling the whole filter assembly downward. However, in some other configurations, the location of the lubricant filter assembly is such that there is no room to allow the lubricant filter cartridge to be moved downwardly and must be changed from a top. Moreover, care should be taken to ensure that there are no debris that falls into a clean lubricant outlet of the filter assembly when changing the filter cartridge. There is disclosed herein a filter assembly that may alleviate at least some of the aforementioned problems. More specifically, the disclosed filter assembly uses a filter housing defining a lower section for receiving the filter cartridge and an upper section for receiving a filter cover that is securable to the filter housing and to the filter cartridge. The upper section has a greater diameter than that of the lower section for creating a shoulder against which the filter cover abuts. A keyway engagement may be defined between the filter cartridge and the filter cover to secure the filter cartridge to the filter cover and to create a sealing engagement therebetween.

The clean lubricant outlet of the filter housing may be defined through a peripheral wall of the filter housing. This may prevent debris from falling into said outlet since the outlet may be out of reach of the debris that would fall vertically with gravity upon removal of the filter cartridge and filter cover.

Referring now to FIGS. 2-4, the filter assembly 30 is shown in greater detail. In the embodiment shown, the filter assembly 30 includes a housing 32, a cover 34, and a filter cartridge 36. The filter cartridge 36 may be removably secured to the cover 34. The housing 32 is configured to contain the filter cartridge 36 and the cover 34 is configured to sealingly engage the housing 32 to create a filter internal volume, or cavity, C within which the lubricant circulates through the filter cartridge 36; the filter cartridge 36 being contain within the filter internal volume C of the housing 32.

In the depicted embodiment, the filter assembly 30 has a generally cylindrical shape and extends about a longitudinal axis L. It is understood that other shapes are contemplated without departing from the scope of the present disclosure.

The housing 32, referred simply as housing 32 herein below, is configured to receive the filter cartridge 36 therein. The filter housing 32 has an inlet (not shown) configured for receiving lubricant to be filtered and has an outlet 32a for outputting a flow of filtered lubricant. The housing 32 has an upper section 32b (FIG. 3) and a lower section 32c (FIG. 2). The lower section 32c is configured to receive a major portion, that is more than half herein, of the filter cartridge 36. The outlet 32a of the housing 32 is defined at the upper section 32b of the housing 32.

In the embodiment shown, the housing 32 has a peripheral wall 32d and an end wall 32e secured to an end of the peripheral wall 32d. The peripheral wall 32d extends circumferentially around the longitudinal axis L of the filter assembly 30 and may be cylindrical. The outlet 32a of the housing 32 is defined through the peripheral wall 32d at the upper section 32b of the housing 32. Having the outlet 32a of the housing 32 locating as such may avoid contaminant to fall into the outlet 32a upon removal of the cover 34 and filter cartridge 36 during maintenance and replacement of the filter cartridge 36.

As shown more clearly in FIGS. 3-4, the outlet 32a of the housing 32 is hydraulically connected with a line 40, which may be part of the housing 32. The line 40 may extend substantially perpendicularly to the peripheral wall 32d of the housing 32 such that the lubricant exits the filter assembly 30 in a radial direction, depicted by arrow A on FIGS. 3-4, relative to the longitudinal axis L. Alternatively, the line 40 may define an angle different than 90 degrees relative to the peripheral wall 32d of the housing 32. Arrows A' and A" in FIGS. 3-4 show that the line 40, and the flow of lubricant exiting the housing 32, may circulate in a radial direction combined with an axial and/or a circumferential direction relative to the longitudinal axis L. The angle the line 40 defines with respect to the housing 32 may depend upon a location where the filter assembly 30 is installed in the gas turbine engine 10.

Still referring to FIGS. 3-4, the housing 32 defines a shoulder 32s at an intersection between the upper and lower sections 32b, 32c of the housing 32. In the embodiment shown, a diameter D1 of the upper section 32b is greater than a diameter D2 of the lower section 32c thereby creating the shoulder 32s. As shown in FIG. 4, the upper and lower sections 32b, 32c of the housing 32 may be cylindrical and may be radially offset from one another. In other words, the upper and lower sections 32b, 32c may not be concentric. Alternatively, the upper and lower sections 32b, 32c may be concentric. In a particular embodiment, this offset between the upper and lower sections 32b, 32c of the housing 32 may create additional space to slide the filter cartridge 36, when said filter cartridge 36 is secured to the cover 34, within the housing 32. This space may be obtained by having the upper and lower sections 32b, 32c of the housing 32 being concentric and by increasing a diameter of the upper section 32b relative to that of the lower section 32c. In a particular embodiment, this offset between the upper and lower sections 32b, 32c of the housing 32 creates the shoulder near the outlet of the housing and may help in protecting the outlet from contaminants that may be released during removal of the filter assembly. In a particular embodiment, the difference in the diameters D1, D2 between the upper and lower sections 32b, 32c of the housing 32 creates the shoulder near the outlet of the housing and may help in protecting the outlet from contaminants that may be released during removal of the filter assembly.

Referring more particularly to FIG. 2, the filter cartridge 36 may include any suitable filtering medium known in the art. In the embodiment shown, the filter cartridge 36 has an annular shape and has an outer wall 36a, an inner wall 36b located radially inwardly of the outer wall 36a relative to the longitudinal axis L of the filter assembly 30. Herein, both the outer and inner walls 36a, 36b extends circumferentially about the longitudinal axis L. Herein, the outer and inner walls 36a, 36b are cylindrical, but other shapes are contemplated. The filter cartridge 36 may define a central passage 36c that may extend from a lower end 36d to an upper end 36e of the filter cartridge 36. The filter cartridge 36 has an inlet 36i and an outlet 36o. In the embodiment shown, the inlet 36i of the filter cartridge 36 corresponds to the outer wall 36a, such that the lubricant enters in the filter cartridge 36 in a substantially radial direction relative to the longitudinal axis L of the filter assembly 30, and the outlet 36o of the filter cartridge 36 corresponds to the central passage 36c at the upper end 36e of the filter cartridge 36, such that the lubricant exits the filter cartridge 36 in a substantially axial direction relative to the longitudinal axis of the filter assembly 30. It is understood that the expressions "upper" and "lower" may be interchanged and that the disclosed filter assembly 30 may be used upside down, or at any other angle.

A plug 38 is secured to the filter cartridge 36 at the lower end 36d thereof. The plug 38 may be used to prevent lubricant to enter the filter cartridge 36 via an annular end face located at the lower end 36d of the filter cartridge 36. In other words, the plug 38 may be used to prevent the lubricant from entering the filter cartridge 36 in a substantially axial direction. The plug 38 may ensure that the oil passes through the filter cartridge 36. Stated differently, the plug 38 may prevent lubricant from penetrating the seal from an axial end face of the filter cartridge 36. The filter cartridge 36 may be free of the plug 38 by having the filter cartridge 36 in abutment against a bottom of the housing 32 to avoid oil from bypassing the filter cartridge 36. As shown more clearly on FIG. 6, a annular groove 38a is defined by the plug 38 and may be configured for receiving a seal, such as an O-ring or any other suitable sealing member, therein.

Referring to FIGS. 3 and 5, for installing a cartridge assembly 42 of the cover 34 and the filter cartridge 36 inside the housing 32, the cartridge assembly 42 is inserted into the housing 32 substantially along an axial direction relative to the longitudinal axis L via an open end 32f (FIG. 5) of the housing 32. The cartridge assembly 42 is moved relative to the housing 32 along the axial direction toward the end wall 32e (FIG. 5) of the housing 32 until the cover 34 is in abutment against the shoulder 32s (FIG. 5) defined by the housing 32.

As shown in FIG. 5, the filter cover 34 has an annular flange 34a at a top end thereof and the filter housing 32 has an annular flange 32g at the open end 32f thereof. The cartridge assembly 42 is moved relative to the housing 32 along the axial direction toward the end wall 32e (FIG. 5) of the housing 32 until the cover 34 is in abutment against the annular flange 32g. Once the cartridge assembly 42 is received within the housing 32, the annular flanges 32g, 34a of the housing 32 and cover 34 may be secured to one another to hold the cartridge assembly 42 in place relative to the housing 32. Any suitable means to secure the annular flanges 32g, 34a to one another may be used. In a particular embodiment, a sealing engagement is created between the annular flanges 32g, 34a. Herein, the annular flanges 32g, 34a have substantially circular shapes, but other shapes are contemplated. Captive fasteners may be used to assemble the cover 34 to the housing 32 in order to reduce the chances of FOD. A quick release latch for a tool may be used to secure the cover 34 to the housing 32.

Alternatively, or in combination, a sealing engagement may be created between the cover 34 and the housing 32 at a location proximate the shoulder 32s of the housing 32. As shown in FIG. 5, an annular groove 34b is defined by the cover 34 at a lower end thereof and extends substantially all around the longitudinal axis L. The annular groove 34b is configured to receive a sealing member, such as an O-ring (not shown), therein. In the embodiment shown, the annular groove 34b faces the radial direction such that the sealing member received therein may be compressed radially between the cover 34 and the peripheral wall 32d of the housing 32. Alternatively, the annular groove 34b may be defined at an axial end face of the cover 34 such that the annular groove 34b faces the axial direction and faces the shoulder 32s of the housing 32 such that the sealing member received within the annular groove 34b is compressed axially between the housing at the shoulder 32s and the cover 34. The cover 34 may define two annular grooves each receiving a respective one of two sealing members; the two annular grooves facing respectively in the radial and axial directions relative to the longitudinal axis L.

Referring more particularly to FIG. 3, the cover 34 may be used to change a direction of the lubricant from being substantially axial relative to the longitudinal axis L to being substantial radial. As aforementioned, the lubricant exits the filter cartridge 36 via its outlet 36o along a direction that is substantially axial and the outlet 32a of the housing 32 is defined through the peripheral wall 32d and may have at least a radial component relative to the longitudinal axis L. In the embodiment shown, the cover 34 is used to redirect the flow of lubricant from being substantially axial to being substantially radial. The cover 34 may be used to impart at least a radial and/or at least a circumferential component to the flow of lubricant.

In the depicted embodiment, the cover 34 has an internal passage 34c that fluidly connects an inlet 34i of the cover 34 to an outlet 34o thereof. The inlet 34i of the cover 34 is in fluid communication with the outlet 36o of the filter cartridge 36 and the outlet 34o of the cover 34 is in fluid communication with the outlet 32a of the housing 32 and with the line 40 that extends therefrom. The internal passage 34c may be defined by two bores extending partially through a body of the cover 34. Herein, the internal passage 34c includes: a first bore extending substantially axially relative to the longitudinal axis L from the outlet 36o of the filter cartridge 36 toward a top end of the cover 34 without extending fully through the cover 34; and a second bore extending from the outlet 34o of the cover 34 in a substantially radial direction to a distal end of the first bore such that the first and second bore are in fluid communication with one another. Other configurations are contemplated. The shape of the internal passage 34c and its orientation inside the cover may vary, including straight holes, smooth cores.

The circulation of the lubricant through the filter assembly 30 is depicted with arrows in FIG. 2. The lubricant enters the internal volume C defined by the housing 32 and passes through the filter cartridge 36 in a substantially radial direction relative to the longitudinal axis L and toward the longitudinal axis L to reach the central passage 36c of the filter cartridge. The lubricant flows axially along the central passage 36c toward the cover 34, enters the internal passage 34c of the cover 34 in a substantially axial direction and is re-oriented, within the internal passage 34c of the cover 34, in a direction having at least a radial component relative to the longitudinal axis L. The lubricant exits the filter assembly 30 via the outlet 32a of the housing 32 and is directed toward other components indeed of lubrication via the line 40 that is hydraulically connected to the housing 32.

With time, the filter cartridge 36 may decrease in efficiency and may become partially clog by the contaminants it has removed from the lubricant circulating therethrough. Consequently, it may be required to periodically disassemble the filter assembly 30 to replace the filter cartridge 36. It may be beneficial to remove the cartridge assembly 42 as a single unit.

Figure 6:
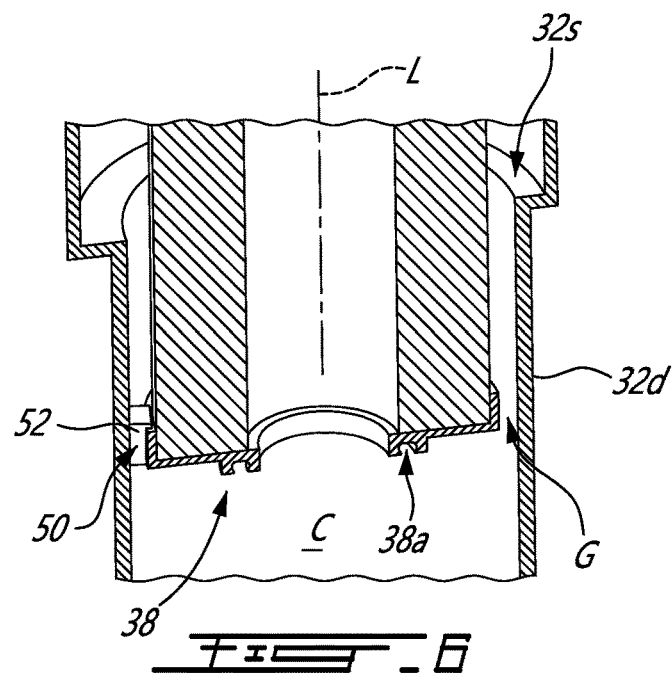
FIG. 6 is a cutaway three dimensional view of a bottom portion of the filter assembly of FIG. 2.

Referring to FIG. 6, while removing the filter cartridge 36 from the housing 32, care should be taken to avoid contact between the filter cartridge 36 and the housing to avoid rubbing or scrapping the filter cartridge 36 against the peripheral wall 32d of the housing 32 which may cause contaminants picked up by the filter cartridge 36 to detach therefrom an to fall into the housing 32. In the embodiment shown, a guiding feature 50 is secured to an end of the filter cartridge 36 that is located at the bottom of the housing 32 upon the cartridge assembly 42 received therein. More specifically, and in the embodiment shown, the guiding feature 50 is secured to the plug 38 at an external periphery thereof. The guiding feature 50 may be provided in the form of one or more tab(s) 52 circumferentially distributed about the longitudinal axis L and that bridge a gap G located radially between the filter cartridge 36 and the housing 32 relative to the longitudinal axis L. The guiding feature 50 may therefore limit contacts between the filter cartridge 36 and the housing 32. The guiding feature may have various alternative shapes and length. It may be displayed in a circular pattern, or it can be a plate on the whole circumference with slots to allow fluid to pass.

Figure 7:
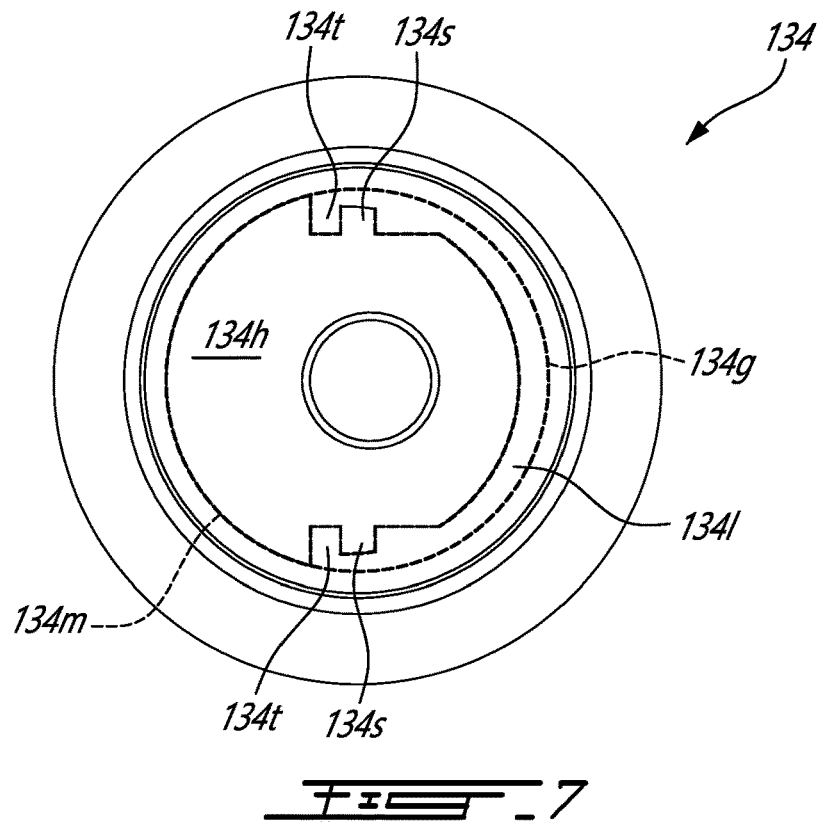
FIG. 7 is a bottom view of a filter cover of a cartridge assembly in accordance with one embodiment.
Figure 8:
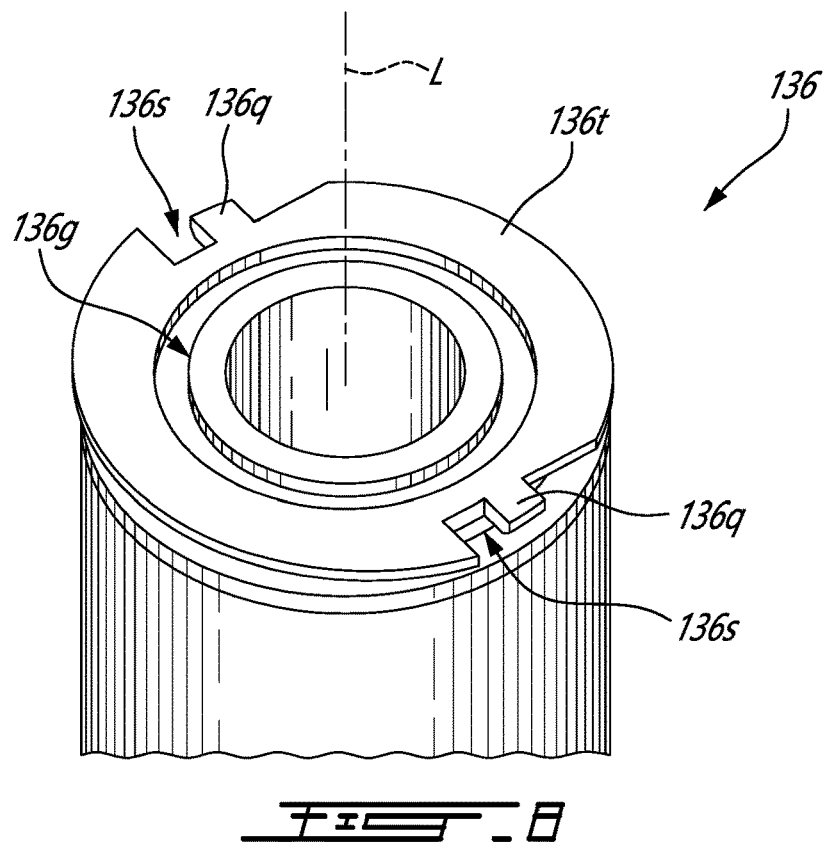
FIG. 8 is a top three dimensional view of a filter cartridge that may be used with the filter cover of FIG. 7.

Referring now to FIGS. 7-8, a cover and a filter cartridge in accordance with another embodiment are shown generally at 134 and 136, respectively. And, referring concurrently to FIGS. 9a to 9c that illustrate steps of assembly the cover 134 to the filter cartridge 136. To create a locking engagement E (FIG. 9c) between the cover 134 and the filter cartridge 136, the filter cartridge 136 defines a tab or a flange 136t that may extend circumferentially around the longitudinal axis L. In the embodiment shown, the flange 136t is located at a distal end of the filter cartridge relative to a distance from the end wall 32e (FIG. 5) of the housing 32 (FIG. 5) in which the filter cartridge 136 may be received. The flange 136t has a thickness t1 (FIG. 9a) taken along the longitudinal axis L. The flange 136t is configured to be received within a groove 134g defined by the cover 134. The groove 134g is shown in dashed line in FIG. 7. The groove 134g may have a depth d1 (FIG. 9a) taken along the longitudinal axis L and that may corresponds substantially to the thickness t1. As shown more particularly on FIG. 7, the groove 134g is located axially between an axial end face 134h of the cover 134 and a lip 134l, which extends partially around the longitudinal axis L. The groove 134g extends radially outwardly relative to the longitudinal axis from an edge of the lip 136l. The cover 134 thereby defines an opening 134m, a periphery of which is depicted in FIG. 7 with a dashed line. The periphery of the opening 134m is defined partially by the lip 134l. As shown in FIGS. 7-8, the periphery of the opening 134m has a shape that corresponds substantially to a shape of the periphery of the flange 136t of the filter cartridge 136. It is understood that the groove and the flange may be defined by the filter cartridge and by the cover in an alternate embodiment without departing from the scope of the present disclosure. In a particular embodiment, the flange 136t may define a chamfer to ease its insertion in the groove.

Figure 9A:
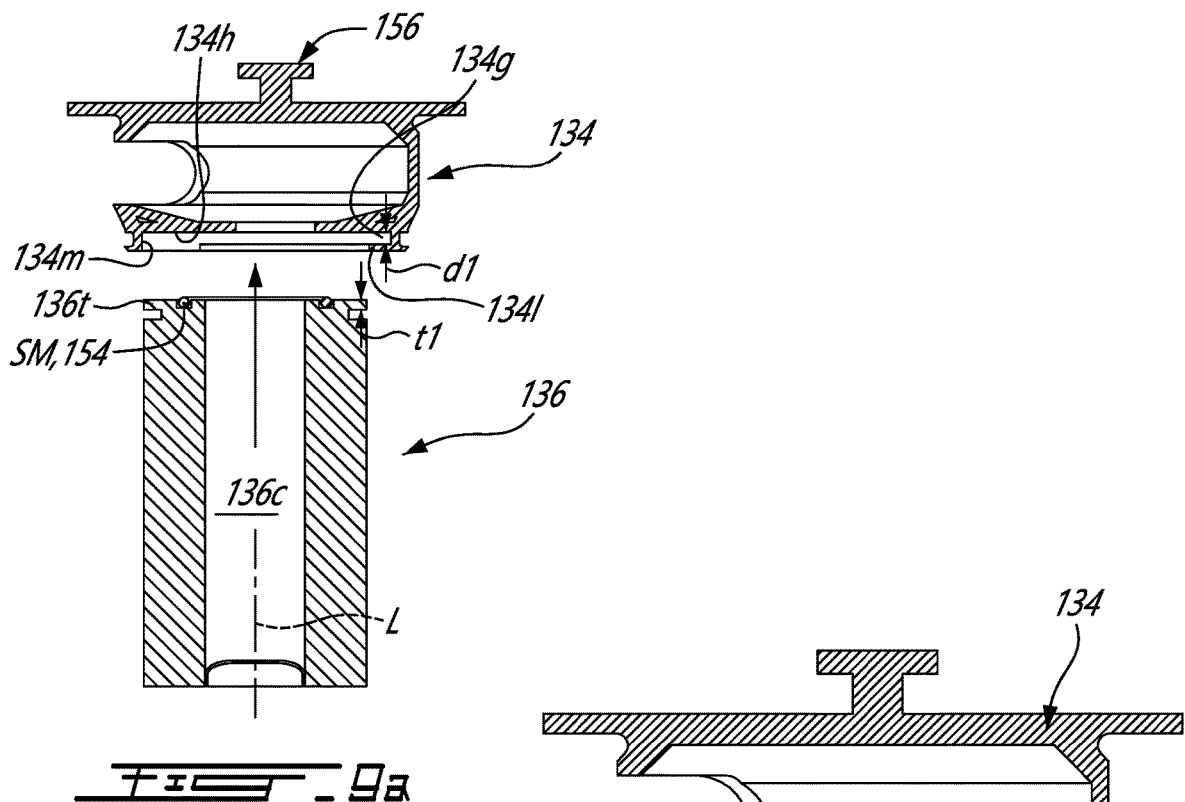
FIGS. 9a to 9c are cutaway views of the cartridge assembly of FIGS. 7-8 illustrating steps to assemble the cartridge assembly.
Figure 9C:
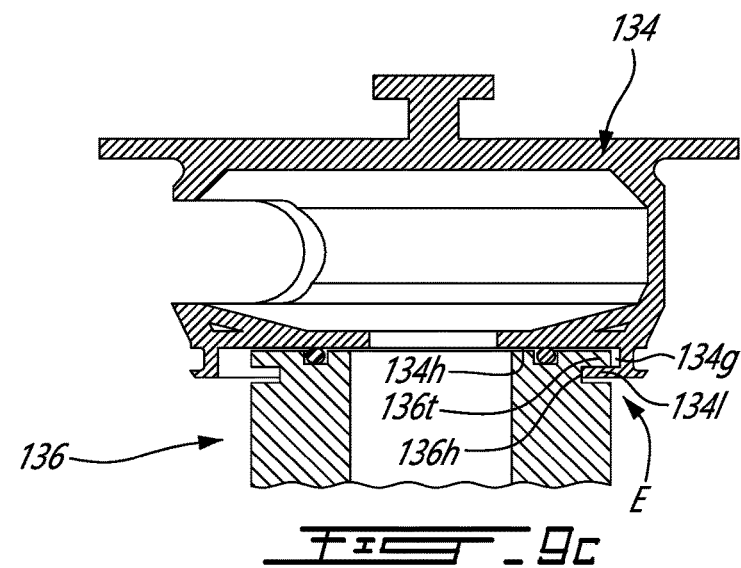
Figure 9B:
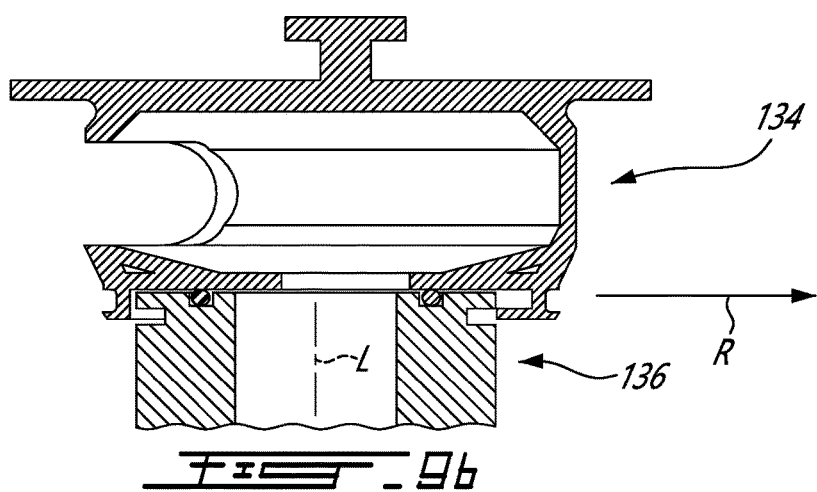

As shown more specifically in FIGS. 9a and 9b, with continued reference to FIGS. 7-8, to assemble the filter cartridge 136 to the cover 134, the filter cartridge 136 and the cover 134 are moved one relative to the other along the longitudinal axis L from a disengaged position shown in FIG. 9a until the flange 136t is received through the opening 134m defined by the cover 134, which corresponds to an intermediate position shown in FIG. 9b. At which point, a sealing member SM, in this case an o-ring 154, which is received within a groove 136g (FIG. 8) of the filter cartridge 136, becomes biased between the filter cartridge 136 and the axial end face 134h of the cover. The filter cartridge 136 may be in abutment against the axial end face 134h of the cover 134 upon the o-ring 154 biased therebetween. The sealing member SM may create a sealing engagement between the cover 134 and the filter cartridge 136 to limit fluid that circulates through the central passage 136c (FIG. 9a) of the filter cartridge 136 and toward the cover 134 from leaking at an interface between the cover 134 and the filter cartridge 136. The sealing member SM may alternatively be a packing, a c-seal, a piston ring with or without a spring, a spring washer, a magnetic seal, or any other type of axial seal.

Referring more particularly to FIGS. 9b and 9c, the cover 134 may be moved relative to the filter cartridge 136 from the intermediary position shown in FIG. 9b to a locked position shown in FIG. 9c. In the embodiment shown, the cover 134 and filter cartridge 136 are moved one relative to the other along a radial direction R (FIG. 9b) relative to the longitudinal axis L. In other words, the cover 134 and the filter cartridge 136 are translated one relative to the other to move them from the intermediary position to the locked position of FIG. 9c. In the locked position, at least a portion of the flange 136t is received within the groove 134g of the cover 134. This creates the locking engagement E that may limit axial movement of the cover 134 relative to the filter cartridge 136 along the longitudinal axis L. The cooperation of the flange 136t and the groove 134g may block axial movements of the cover 134 and the filter cartridge 136 one relative to the other. In the embodiment shown, the flange 136t becomes sandwiched between the lip 134l of the cover 134 and the axial end face 134h of the cover 134. In the embodiment shown, in the locked position depicted in FIG. 9c, the lip 134l of the cover is slidingly received within a groove 136h defined by the cartridge proximate the flange 136t upon the flange 136t received within the groove 134g of the cover 134.

In an alternate embodiment, the cover 134 and the filter cartridge 136 may be rotated one relative to the other about the longitudinal axis L to move the cover and cartridge from the intermediate position to the locked position. Other configurations are contemplated without departing from the scope of the present disclosure. Once the cover 134 and the filter cartridge 136 are in the locked position, the filter cartridge assembly may be moved within the housing 32 (FIG. 2) using a handle 156 (FIG. 9a) located on top of the cover 134. Other means of manipulating the cartridge assembly are contemplated.

Referring back to FIGS. 7-8, the shape of the opening 134m is configured to maximize a surface contact, or retention surface, area between the lip 134l and the flange 136t of the cover 134 and the filter cartridge 136 respectively. In the embodiment shown, the opening 134m defines at least one tooth, two teeth 134t in the embodiment shown, and at least one slot, two slots 134s in the embodiment shown. Correspondingly, the flange 136t may define at least one slot, two slots 136s in the embodiment shown, and at least one tooth, two teeth 136q in the embodiment shown. The teeth 136q of the flange 136t are slidably received within the slots 134s of the opening 134m and the teeth 134t of the opening 134m are slidingly receive within the slots 136s of the flange 136t. In other words, the opening 134m may have a keyway shape corresponding to a shape of the flange 136t to allow one to be received within the other. In the embodiment shown, the opening 134m and the flange 136t are non-axisymmetric and may define a symmetry plane containing the longitudinal axis L.

Figure 10:
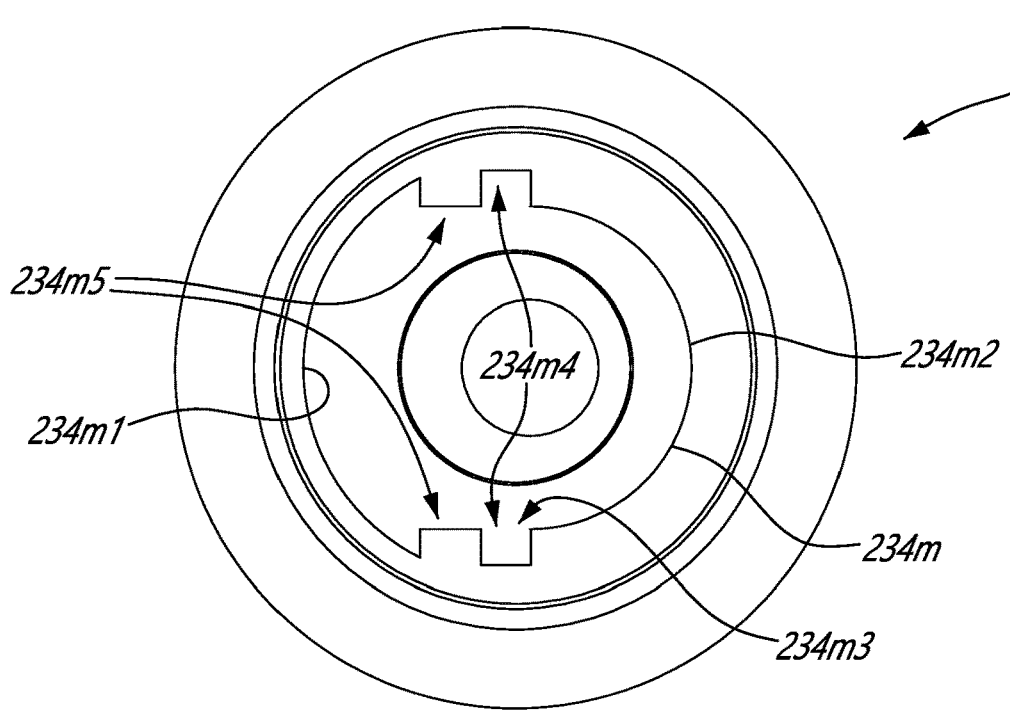
FIG. 10 is a bottom view of a filter cover in accordance with another embodiment.
Figure 11:
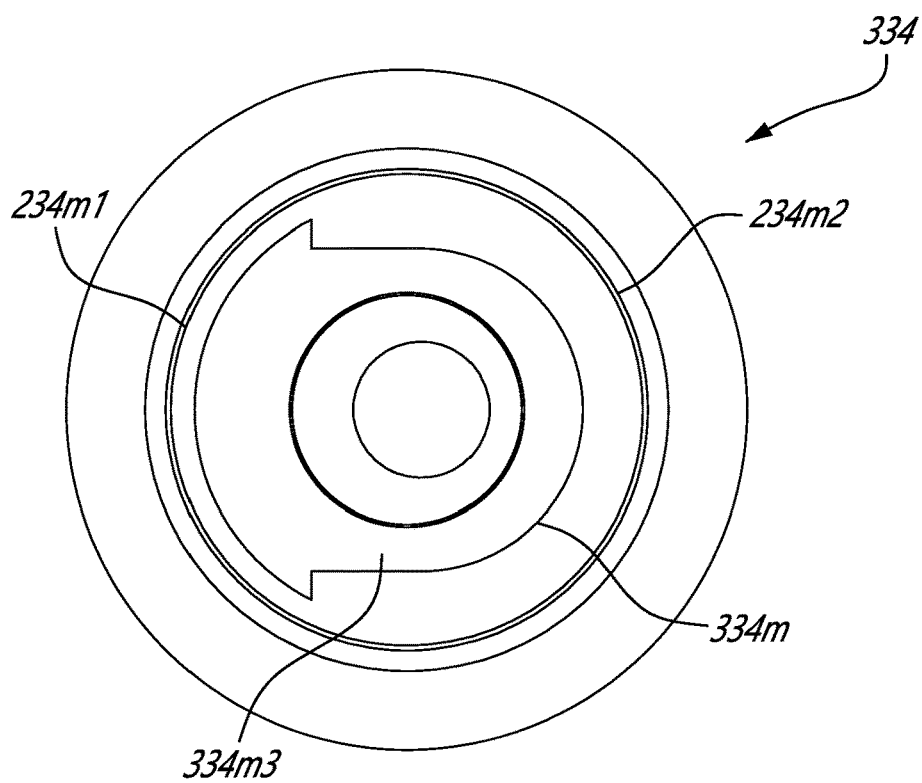
FIG. 11 is a bottom view of a filter cover in accordance with another embodiment.

Referring now to FIGS. 10-11, alternative embodiments of the cover are shown generally at 234 and 334, respectively. The cover 234, 334 may different from the cover 134 of FIG. 7 by the shape of their opening 234m, 334m. As shown, a number of teeth/slot may be varied. Any other suitable shape may be used. The shape of the opening of the cover and that of the flange may be used to ensure that the filter cartridge and cover are matingly engageable to one another solely in one orientation of the cover relative to the filter cartridge.

Referring more particularly to FIG. 10, the opening 234m includes first and second curved sections 234m1, 234m2 diametrically opposed to one another; a diameter the first curved section 234m1 being greater than that of the second section 234m2. The first and second curved sections 234m1, 234m2 are connected via a middle section 234m3. The middle section 234m3 defines two slots 234m4 and two teeth 234m5; the two slots facing one another and the two teeth facing one another. In the embodiment shown, the middle section is tangent to the second section. Other configurations are contemplated. For instance, in FIG. 7, the middle section is straight and a junction between the middle and second sections defines a kink. Referring more particularly to FIG. 11, the opening 334m is similar to the opening 234m described above with reference to FIG. 10, but the middle section 334m3 is free of the teeth and slot.

The different shapes of the opening and corresponding flange may be selected to provide a uniformity of a biasing force exerted by the interaction of the cover and filter cartridge on the sealing member when in the locked position shown in FIG. 9c. The shape of the opening may dictate a surface area used to retain the filter as well as its disposition near the seal. The shape shown in FIG. 10 may offer a larger retaining surface. The teeth may be used as a mean to prevent or limit the rotation of the filter cartridge 36 relative to the cover 34 should a sliding motion is used to disassemble the filter cartridge 36 from the cover 34.

Figure 12:
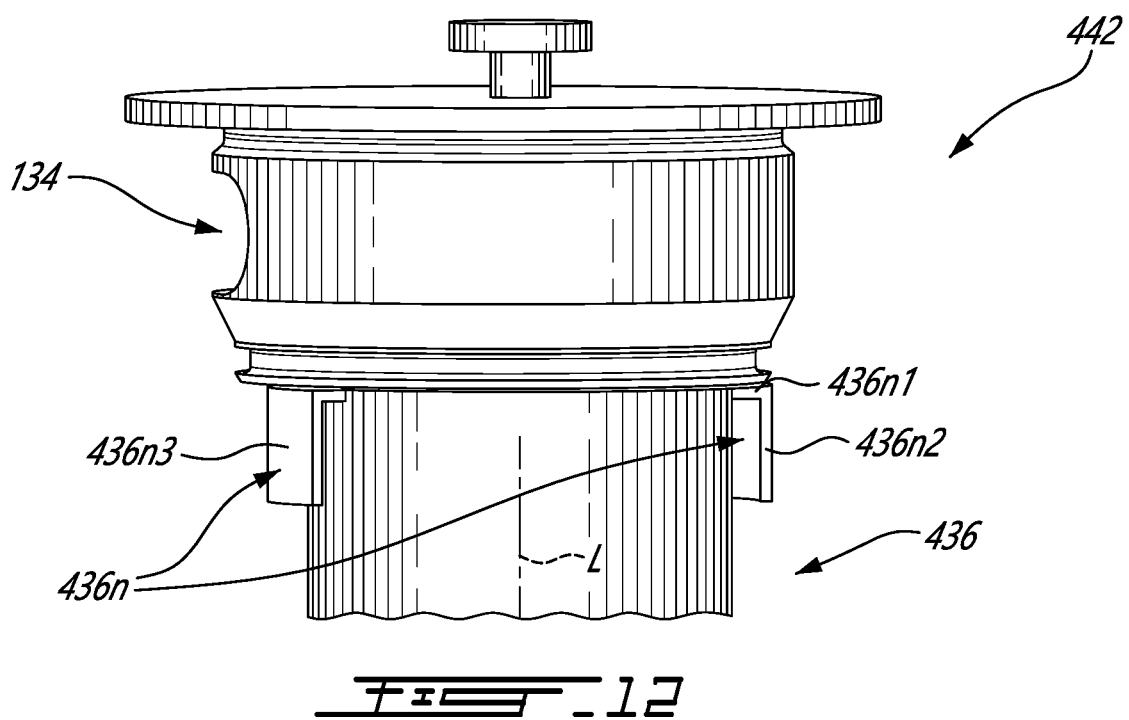
FIG. 12 is a three dimensional view of a cartridge assembly in accordance with another embodiment.
Figure 13:
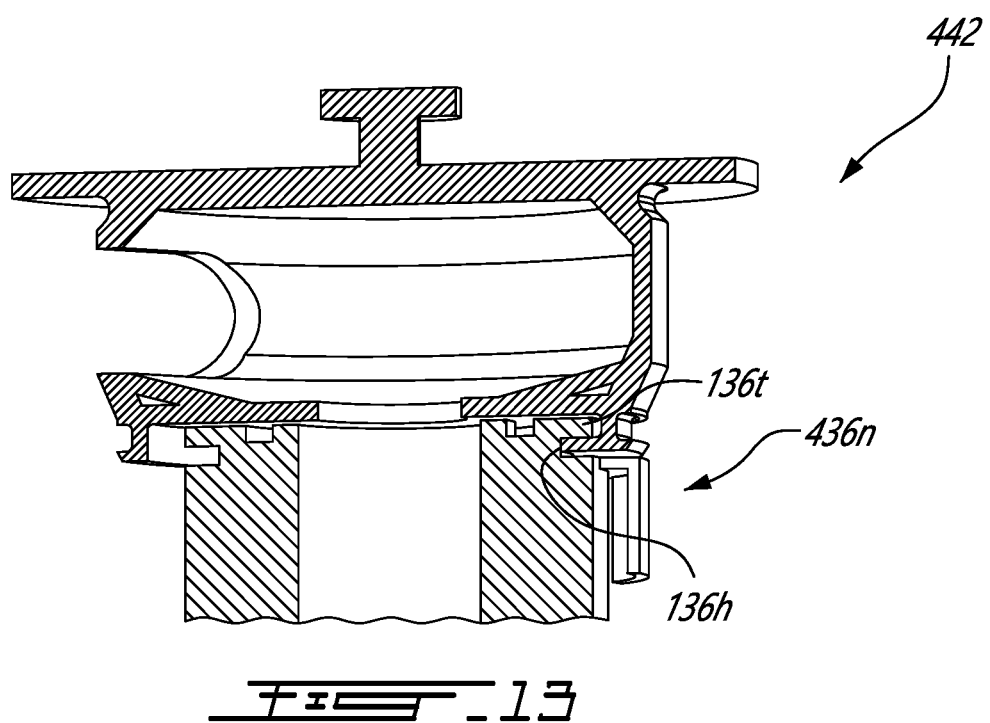
FIG. 13 is a cutaway three dimensional view of the cartridge assembly of FIG. 12.

Referring to FIGS. 12-13, a cartridge assembly in accordance with another embodiment is shown generally at 442. The cartridge assembly 442 includes a cover which may correspond to the cover 134 described above with reference to FIG. 7 and a filter cartridge 436 in accordance with another embodiment. In some cases, it may be required to grab the filter cartridge 436 for either assisting its removal from the housing 32 (FIG. 2) and/or to orient it with respect to the cover 134. However, the filtering medium of the cartridge may be soft and grabbing it directly may deform it, which may impair its filtering efficiency.

In the embodiment shown, the filter cartridge 436 includes at least one, two in the embodiment shown, holding tabs 436n, each of which may be L-shaped including a radial protrusion 436n1 extending radially away from a proximal end of the filter cartridge 436 and an axial protrusion 436n2 protruding axially away from a distal free end of the radial protrusion 436n1. The axial protrusions 436n2 defines a surface 436n3 against which a user may lay his/her finger to manipulate the filter cartridge 436. In the embodiment shown, the axial protrusions 436n2 extends axially relative to the longitudinal axis L toward the end wall of the housing 32 (FIG. 2) when received therein. As shown in FIG. 13, the holding tabs 436n are axially offset from the flange 136t and groove 136h defined by the filter cartridge 436.

The support or holding tabs 436n may be used if the pinch (e.g. biasing force) between the cover 134 and the sealing member SM (FIG. 9a) is high enough to expect a deformation of the filter cartridge 436 during assembly. The tabs 436n may ease the grip by hand or tool and may be configured to re-direct the load path outside the filter element (e.g. filtering medium). The support may or may not serve as a filter guiding feature once in the locked position. In other words, the tabs may be in abutment against the wall of the housing to maintain the cartridge concentric with the housing.

Figure 14:
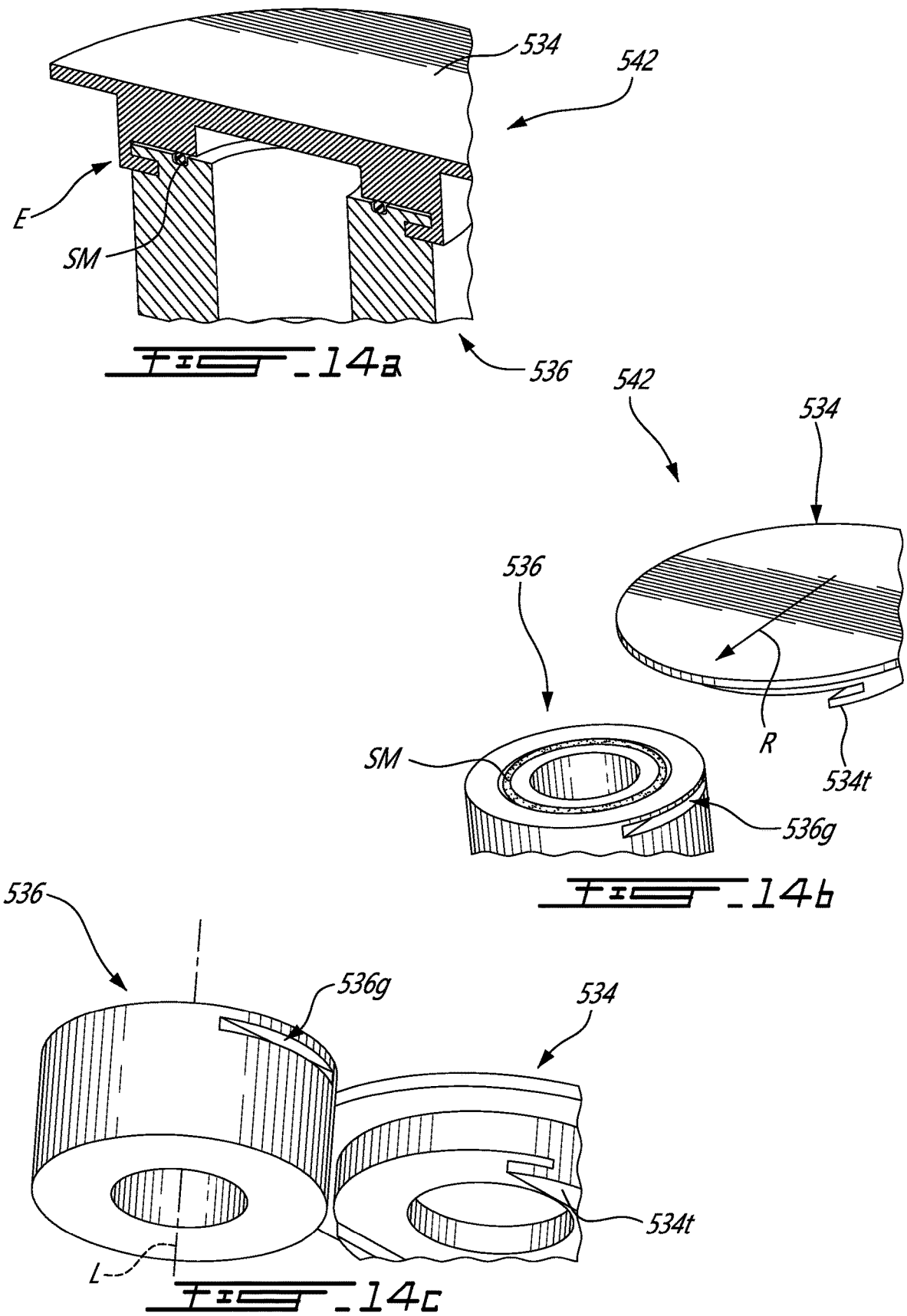
FIGS. 14a to 14c are respectively three dimensional cutaway view; schematic top three dimensional exploded view; and schematic bottom three dimensional exploded view of a filter cartridge assembly in accordance with another embodiment illustrating steps to assemble the filter cartridge assembly.

Referring to FIGS. 14a to 14c, another embodiment of a cartridge assembly is shown generally at 542. The assembly 542 includes a cover 534 and a filter cartridge 536. In the embodiment shown, the cover 534 defines two tabs 534t that are diametrically opposed to one another and the filter cartridge 536 defines grooves 536g, two in the embodiment shown, that are diametrically opposed to one another. Each of the tabs 534t of the cover 534 may be slidingly received within a respective one of the grooves 536g of the filter cartridge 536. It is understood that the cover may define the grooves and the cartridge may define the tab in an alternate embodiment.

FIGS. 14b and 14c illustrate the assembly 542 in the disengaged position and FIG. 14a illustrates the assembly in the locked position in which the sealing member SM is compressed between the cover 534 and the filter cartridge 536. To create the locking engagement E between the cover 534 and the filter cartridge 536, the cover and cartridge are moved one relative to the other until the grooves 536g are in register with the tabs 534t. At which point, the cover 534 and the filter cartridge 536 are moved one relative to the other in a radial direction R relative to the longitudinal axis L to slide the tabs 534t within the grooves 536g.

Figure 15:
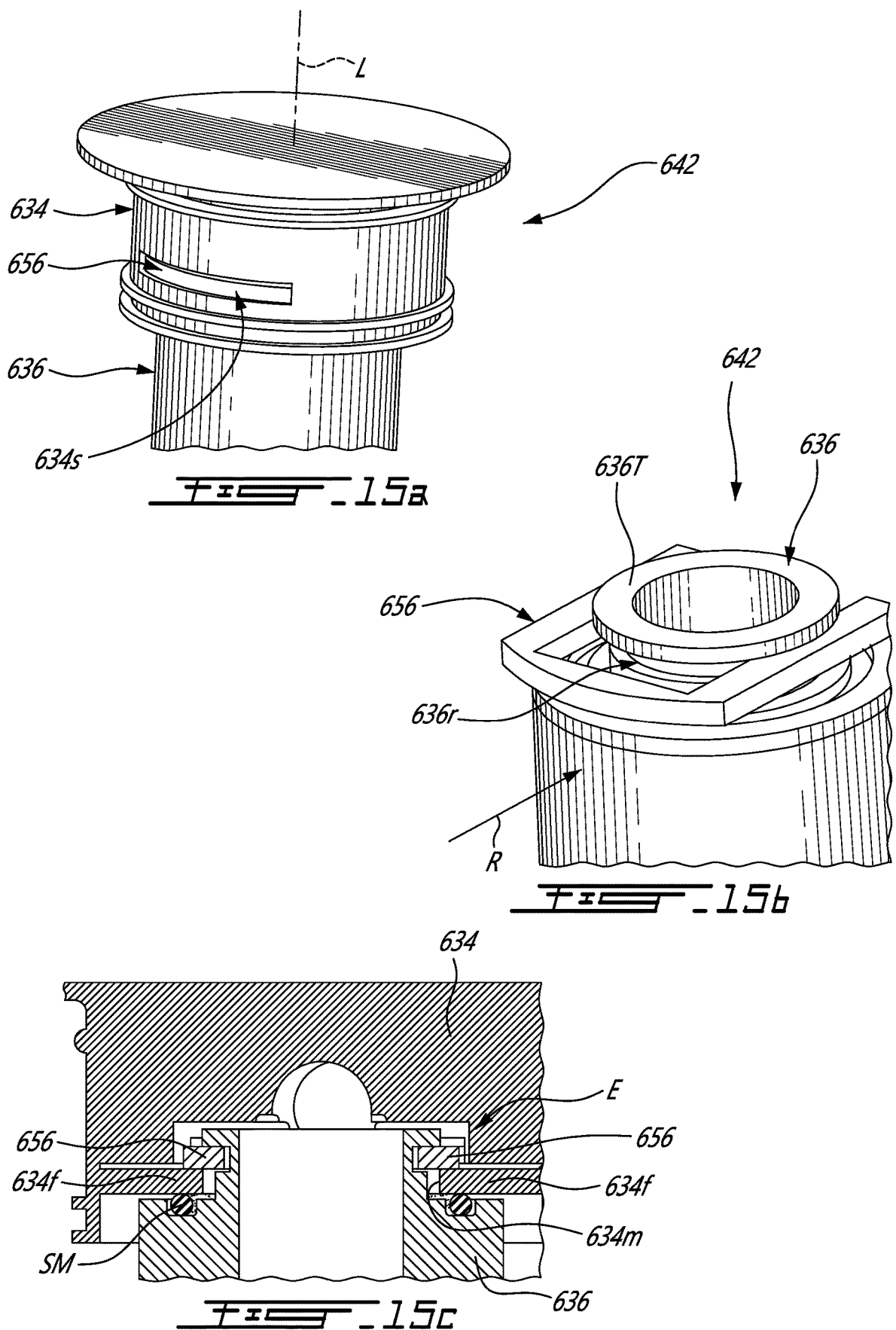
FIGS. 15a to 15c are respectively assembled top three dimensional view; schematic partially assembled top three dimensional view; and schematic assembled cutaway view a filter cartridge assembly in accordance with another embodiment illustrating steps to assemble the filter cartridge assembly.

Referring to FIGS. 15a to 15c, another embodiment of a cartridge assembly is shown generally at 642. The assembly 642 includes a cover 634, a filter cartridge 636, and a locking member also referred to as a fork 656. In the embodiment shown, the cover 634 defines an elongated slot 634s dimensioned for receiving the fork 656. The filter cartridge 636 defines a tab 636t at an extremity of the filter cartridge 636. A recess 636r is defined by the filter cartridge 636 proximate the tab 636t. The cover 634 has an opening 634m suitably dimensioned for receiving the tab 636t of the filter cartridge 636.

To create the locking engagement E between the cover 634 and the filter cartridge 636, the cover 534 and the filter cartridge 636 are moved one relative to the other along the longitudinal axis L until the tab 636t of the filter cartridge 636 is received within the opening 634m of the cover 634. At which point, the fork 656 may be inserted in the elongated slot 634s of the cover 634 in a radial direction R relative to the longitudinal axis L. The fork 656 thereby locks the tab 636t of the filter cartridge 636 within the cover 634. More specifically, the fork 656 has an inner dimension suitably dimensioned to be able to be received within the recess 636r of the filter cartridge 636 and that is less than a diameter of the tab 636t, and has an outer dimension that is greater than a dimension of the opening 634m of the cover 634 such that, upon the fork 656 received within the elongated slot 634s of the cover 634, movement of the cover 634 relative to the filter cartridge 636 along the longitudinal axis L is limited by the fork 656 and, more specifically, limited by the interaction of the fork 656 with the tab 636t of the filter cartridge 636 and with an annular flange 634f of the cover 634, which defines the opening 634m of the cover 634. In other words, the fork 656 is configured to be in abutment with both of the tab 636t of the filter cartridge 636 and with the annular flange 634f of the cover 634 to limit movements of the cover 634 relative to the filter cartridge 636.

Referring now to FIGS. 16-20, another embodiment of a filter assembly is shown at 730. The filter assembly 730 includes a housing 732 and a cartridge assembly 742 receivable in the housing 732. The housing 732 extends along a longitudinal axis L. The cartridge assembly 742 includes a cover 734 sealingly engageable to the housing 732 to close an open end 732a of the housing 732. The cartridge assembly 742 includes a filter cartridge 736, which includes a filtering medium or core, provided here in annular form, for removing unwanted particles from oil flowing through the filter assembly 730.

Figure 16:
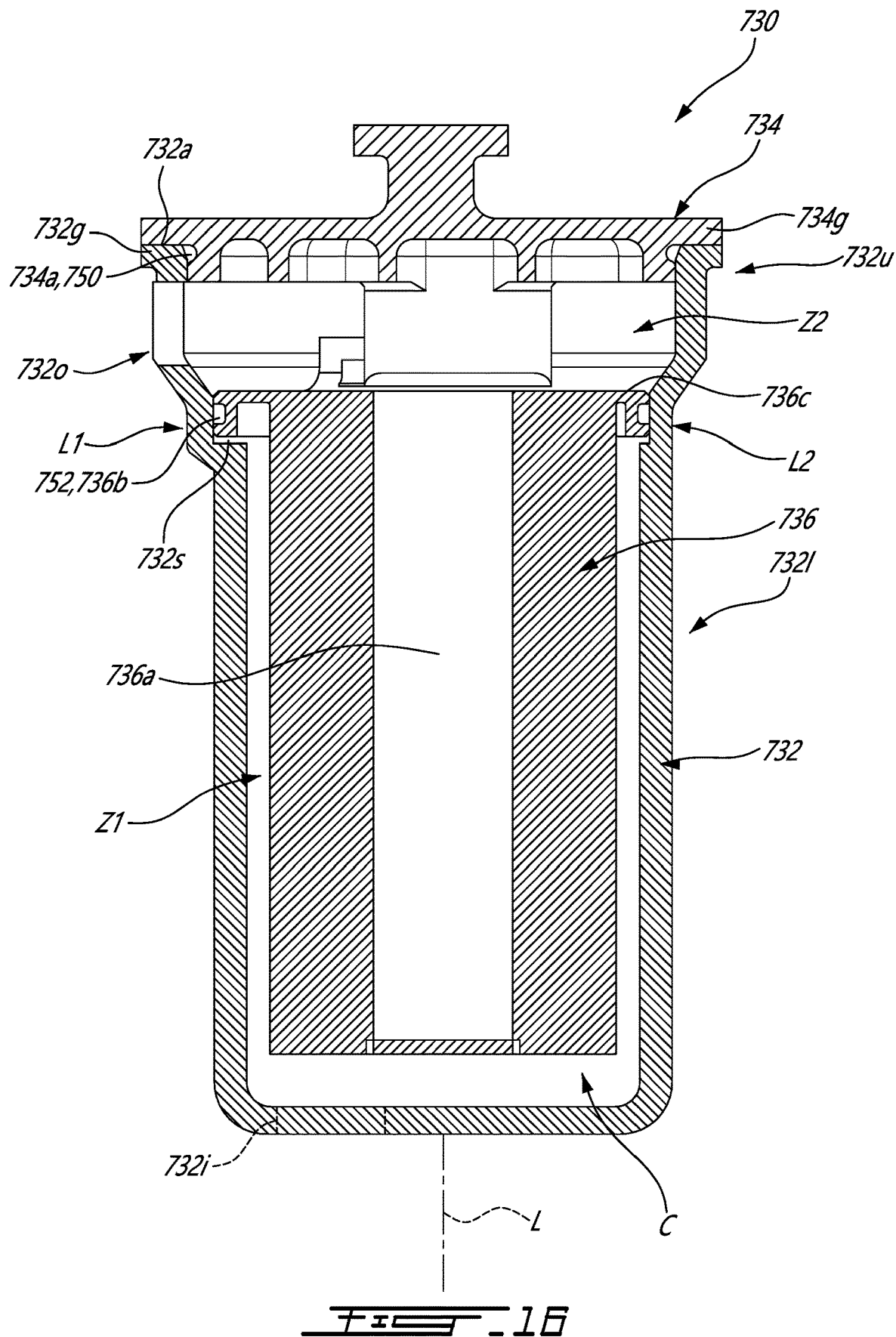
FIG. 16 is a cutaway view of a filter assembly in accordance with yet another embodiment.

As shown in FIG. 16, the housing 732 has an inlet 732i, which is shown here defined through a bottom wall of the housing 732, but may alternatively be defined through a side or peripheral wall of the housing 732. The inlet 732i is hydraulically connectable to an oil system of the gas turbine engine 10 (FIG. 1) for receiving a flow of oil that may contain debris to be removed. The housing 732 has an outlet 732o, which is defined through a side wall of the housing 732 proximate the open end 732a of the housing 732 as will be explained below. The housing 732 may be similar to the housing 32 described above with reference to FIGS. 2-6.

Figure 17:
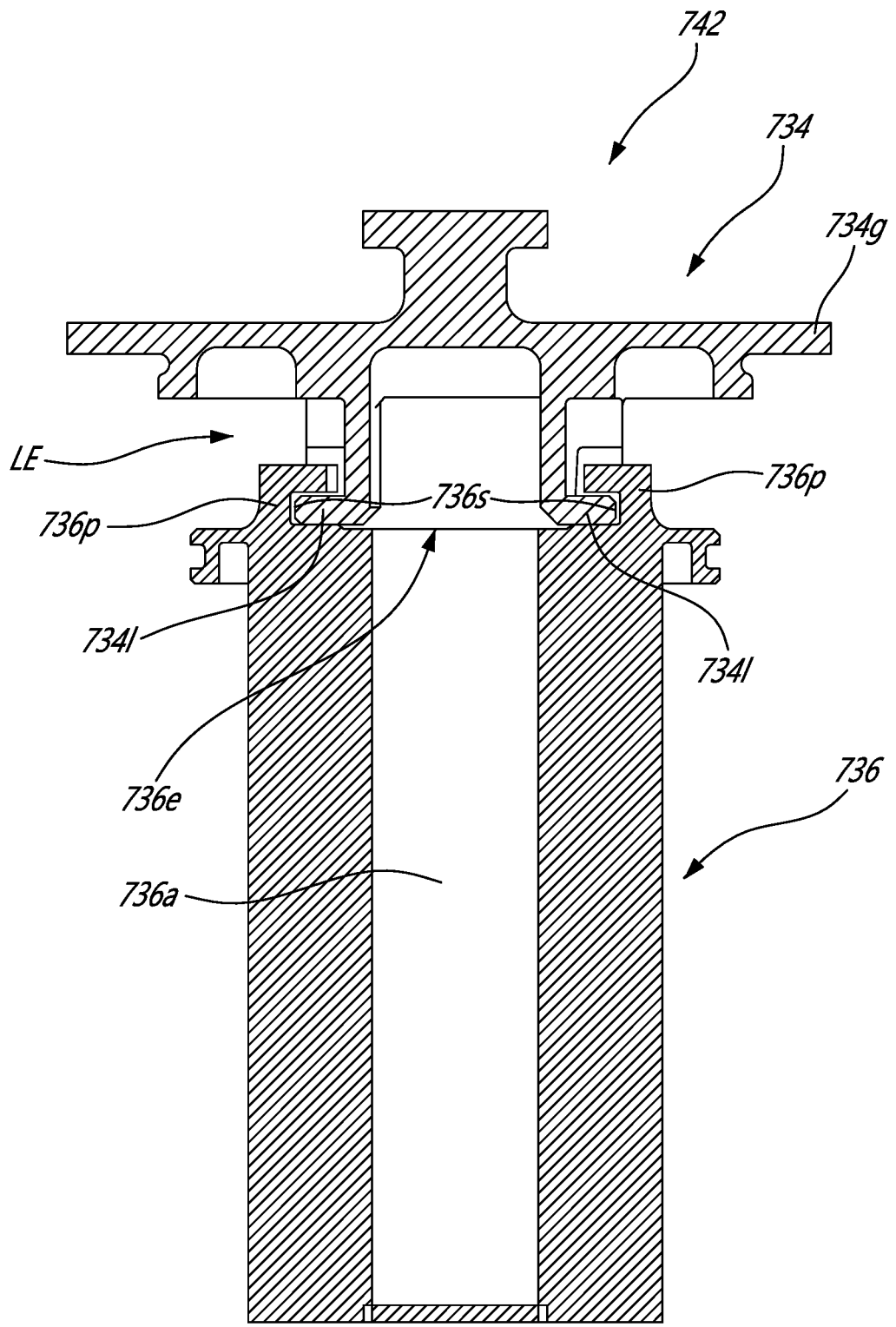
FIG. 17 is a cutaway view of a cartridge assembly of the filter assembly of FIG. 16.

Referring to FIGS. 16-17, the housing 732 defines an internal volume C sized for receiving at least a portion of the cartridge assembly 742 (FIGS. 20-21). A first sealing engagement is defined between the cover 734 and the housing 732 to close the open end 732a of the housing 732. This first sealing engagement may be provided by a first sealing member 750, such as an O-ring, received within a groove 734a defined by the cover 734. The groove 734a and the first sealing member 750 may extend circumferentially all around the longitudinal axis L. The first sealing member 734a may be radially biased between an inner face of the housing 732 and the cover 734. The groove 734a may alternatively be defined by the housing 732. It will be appreciated that, alternatively or in combination, the sealing engagement may be defined by annular abutting faces of the cover 734 and the housing 732 at the open end 732a of the housing 732. This first sealing engagement limits oil from leaking outside the internal volume V of the housing 732. Any suitable means may be used for sealing the cover 734 to the housing 732 such as, for instance, face seal, radial seal, corner packing, gasket, or any combination of the above. A mean may be used to retain the cover 734 axially. This mean may include, for instance, a bolded joint including bolds, studs and nuts. A threading engagement between the cove 743 and the housing 732 is contemplated in conjunction with an O-ring or other suitable sealing means.

In the embodiment shown, the cover 734 is secured to the housing 732 via an annular flange 734g of the cover 734 in abutment against an annular flange 732g of the housing 732; the annular flange 732g of the housing 732 extending around the open end 732a of the housing 732. The annular flange 732g of the housing 732 may be fastened to the annular flange 734g of the cover 734 using any suitable fasteners. A sealing engagement may be provided between those two flanges 732g, 734g via a gasket or a face seal located between the two flanges 732g, 734g.

A second sealing engagement is defined between the filter cartridge 736 and the housing 732 to divide the internal volume C in a first zone, or un-filtered zone Z1, and a second zone, or filtered zone Z2. The used oil flows in the filter assembly 730 via the inlet 732i defined by the housing 732 and reaches the un-filtered zone Z1. The oil then flows through the filtering medium of the filter cartridge 736 in a substantially radial direction relative to the longitudinal axis L until it reaches an inner passage 736a of the filter cartridge 736. The oil then flows to the filtered zone Z2 via which it exits the filter assembly 730 via the outlet 732o defined by the housing 732. The inlet 732i communicates with the unfiltered zone Z1 and the outlet 732o communicates with the filtered zone Z2. The two zones communicate together through the filtering medium of the filter cartridge 736.

Considering that both clean and used oil flow in the filter assembly 730, it may be required to isolate these two zones to prevent used oil from flowing out of the housing 732 via the outlet 732o. In the embodiment shown, a second sealing member 752 is provided between the housing 732 and the filter cartridge 736. In the depicted embodiment, the second sealing member 752, which may be an O-ring, is received within a groove 736b defined by the filter cartridge 736. More specifically, the filter cartridge 736 includes a flange 736c that extends in a direction having a radial component relative to the longitudinal axis L. The flange 736c may be monolithic with a top portion of the filter cartridge 736. The flange 736c extends radially beyond the filtering medium in the embodiment shown. The flange 736c extends radially from the filtering medium and defines the groove 736b at its distal end. The groove 736b extends circumferentially all around the longitudinal axis L. The second sealing member 752 is therefore biased radially between an inner face of the housing 732 and the flange 736c to define a sealing engagement between the filter cartridge 736 and the housing 732. Therefore, the oil may flow from the unfiltered zone Z1 to the filtered zone Z2 solely through the filtering medium of the filter cartridge 736. It will be appreciated that any other sealing member may be used such as a C-seal, a face seal, a tight fit, and so on.

As previously explained with reference to FIGS. 2-4, the housing 732 has an upper section 732u and a lower section 732l. The lower section 732l is sized to receive a major portion, that is more than half herein, of the filter cartridge 736. The outlet 732o of the housing 732 is defined at the upper section 732u of the housing 732. The lower section 732l has a diameter less than that of the upper section 732u to define an shoulder 732s at an intersection between the lower section 732l and the upper section 732u. The shoulder 732s faces a direction having an axial component relative to the longitudinal axis L and faces the open end 732a of the housing 732. The distal end of the annular flange 736c that defines the groove 736b receiving the second sealing member 752 may be in abutment against the shoulder 732s. In the present case, an axial position of the filter cartridge 736 relative to the housing 732 is established by the cover 734 and, more particularly, by the abutment of the flange 734g of the cover against the flange 732g of the housing 732; a gap may remain between the annular flange 736c of the filter cartridge 736 and the shoulder 732s of the housing 732. It will be appreciated that, alternatively or in combination, the groove may be located such that the second sealing member 752 is located axially between the flange 736c and the shoulder 732s and biased axially therebetween.

Still referring to FIG. 16, in the embodiment shown, the upper section 732u and the lower section 732l are radially offset from one another. In other words, the upper section 732u and the lower section 732l are non-concentric. They have respective central axis that may be parallel, but spaced apart from one another. Hence, a dimension of the shoulder 732s may vary around the longitudinal axis L. The dimension of the shoulder 732s, which corresponds to a radial dimension relative to the longitudinal axis L, is maximal at a first location L1 and minimal at a second location L2. The first location L1 and the second location L2 are diametrically opposed from one another. As shown in FIG. 16, the first location L1 where the radial dimension of the shoulder 732s is maximal is circumferentially aligned with the outlet 732o of the housing 732. As explained below, this may maximize clearance between the filtering medium of the filter cartridge 736 and the outlet 732o thereby minimizing debris falling into the outlet 732o upon replacement of the filter cartridge 736.

In an alternate embodiment, the annular flange 736c and the groove 734b of the filter cartridge 736 may have a shape differing than that of the filtering medium of the filter cartridge 736. For instance, the annular flange 736c may be oval-shaped. The housing may be suitably shaped to accommodate this oval-shaped annular flange. The oval-shape of the annular flange may be centered with regards to the housing 732. Alternatively, the oval-shape may be offset from a center of the housing 732.

Moreover, the flange 736c of the filter cartridge 736 and the filtering medium, and its inner passage 736a, are non-concentric from one another. Again, they may have respective central axis that are parallel, but spaced apart from one another. Consequently, a radial distance relative to the longitudinal axis L between the groove 736b, which receives the second sealing member 752, and the filtering medium is maximal at the first location L1, which registers with the outlet 732o, and minimal at the second location L2, which is diametrically opposed to the first location 11. This may ensure uniform radial clearance between the housing 732 and the filtering medium of the filter cartridge 736 all around the circumference of the filtering medium. Moreover, this may further contribute in increasing a distance between the filtering medium and the outlet 732o of the housing 732, which may further help in keeping the outlet 732o free of falling debris from the filtering medium.

Figure 18:
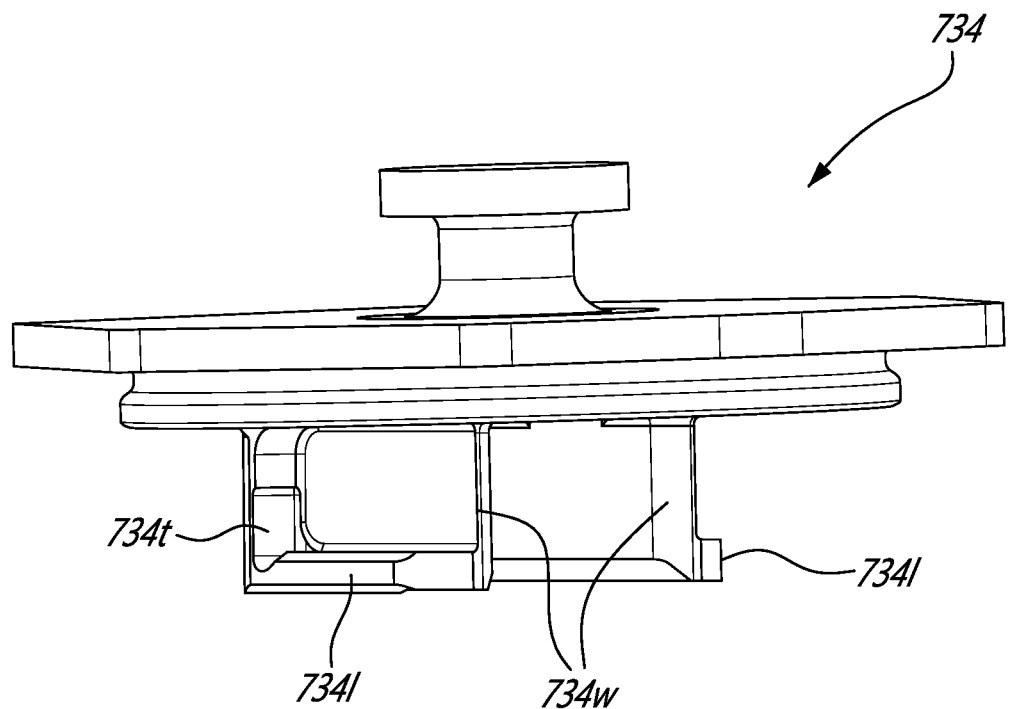
FIG. 18 is a three dimensional view of a cover of the cartridge assembly of FIG. 17.
Figure 19:
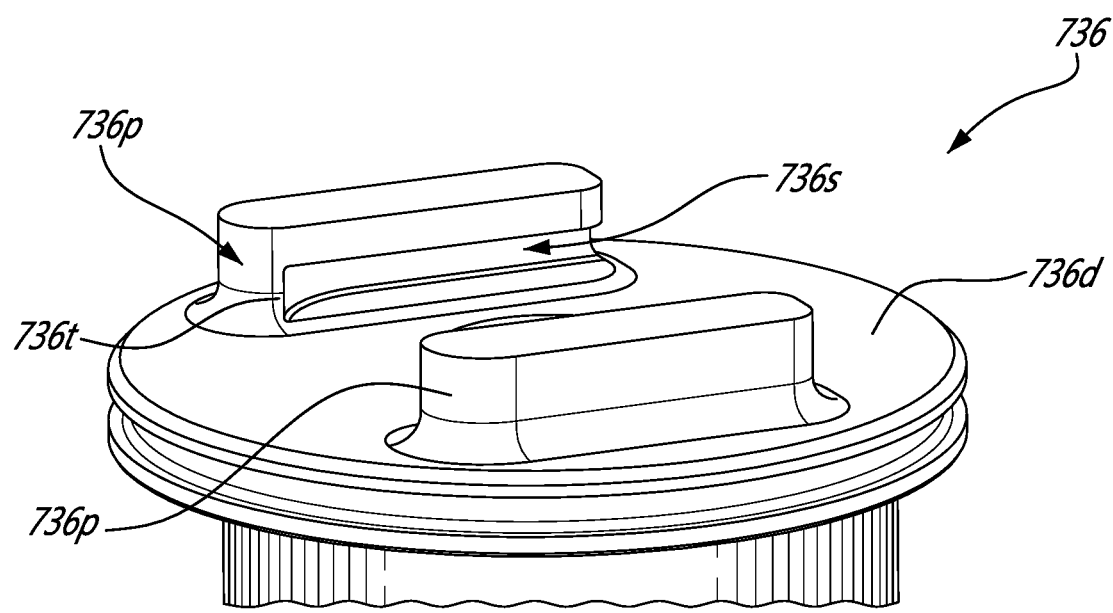
FIG. 19 is a three dimensional view of a portion of a cartridge for the cartridge assembly of FIG. 17.

Referring more particularly to FIGS. 17-19, a locking engagement LE is defined between the cover 734 and the filter cartridge 736. The locking engagement LE is used to secure the filter cartridge 736 to the cover 734 and to limit an axial movement of the cover 734 relative to the filter cartridge 736 relative to the longitudinal axis L. In the depicted embodiment, the locking engagement LE is defined by a cooperation of one or more legs into one or more slots.

The filter cartridge 736 includes top wall 736d that defines the flange 736c, and from which protrudes the filtering medium. The top wall 736d has an aperture 736e (FIG. 17) defined therethrough. The aperture 736e communicates with the inner passage 736a of the filtering medium to allow clean oil to flow from the first zone Z1 to the second zone Z2. As shown in FIGS. 17 and 19, the filter cartridge 736 includes two protrusions 736p each extending from the top wall 736d along a direction having an axial component relative to the longitudinal axis L and away from the filtering medium. The two protrusions 736p are spaced apart from one another and are disposed on respective opposite sides of the aperture 736e. In other words, the aperture 736e is between the two protrusions 736p. It will be appreciated that, in one embodiment, only one protrusion may be provided. Each of the two protrusions 736p defines a respective one of slots 736s that are engageable by the cover 734 as will be explained below. The two slots 736s face one another, they may alternatively face away from on another. In the depicted embodiment, the two slots 736s are parallel to one another, but other configurations are contemplated.

The cover 734 includes two legs 734l located at distal ends of two webs 734w. The two legs 734l are transverse to the two webs 734w. The two legs extend away from one another, although they may alternatively face toward one another. Each of the two legs 734l is sized to be slidingly received within a respective one of the two slots 736s along a direction that may be normal to the longitudinal axis L. The locking engagement LE is defined by the two legs 734l received within the two slots 736s and is shown in FIG. 17. As illustrated, each of the two protrusions 736p defines an abutment face that faces and abuts a respective one of the two legs 734l when the two legs 734l are received into the two slots 736s. It will be appreciated that, in an alternate embodiment, the one or more legs may be defined by the filter cartridge 736 and the one or more slots may be defined by the cover 734. In some other configurations, a T-shaped groove may be defined by one of the cover 734 and the filter cartridge 736 and sized to receive a correspondingly shaped member defined by the other of the cover 734 and the filter cartridge 736 to lock the cover 734 to the filter cartridge 736. Any other suitable means of locking axially the cover 734 to the filter cartridge 736 are contemplated without departing from the scope of the present disclosure. In some cases, a rotation of the cover 734 relative to the filter cartridge 736 may lock these two components together. Dogs and slots may be used for this purpose. A combination of axial and radial movements may be used to axially lock the cover 734 to the filter cartridge 736. The legs 736l may be reinforced by ribs or bent sections to improve performance in compression during assembly and in tension during disassembly.

Referring more particularly to FIGS. 18-19, the two slots 736s are closed-ended. In other words, stoppers 736t are located at ends of the two slots 736s. Similarly, stoppers 734t are located at ends of the legs 734l. Hence, the cover 734 is securable to the filter cartridge 736 in solely a single relative circumferential orientation one relative to the other. In other words, the slots 736s of the filter cartridge 736 define each a single inlet via which the legs 734l may be inserted. And, the legs 734l are blocked at one end by the stoppers 734t. Consequently, this configuration may deter a user from mis-assembling the cover 734 to the filter cartridge 736 in a wrong relative orientation.

Moreover, because of the non-concentricity of the upper section 732u and the lower section 732l of the housing 732, the cartridge assembly 742 may be received into the housing 732 in a single relative orientation to ensure that the location L1, where the radial dimension of the flange 736c (FIG. 16) of the filter cartridge 736 is circumferentially aligned with the outlet 732o of the housing 732 and aligned with the location L1 where the radial dimension of the shoulder 732s is maximal.

In the embodiment shown, if one were to insert the cartridge assembly 742 in the wrong orientation relative to the housing 732, the cover 734 might not be able to be received into the open end 732a of the housing 732. This may prevent the annular flange 734g of the cover 734 from abutting the annular flange 732g of the housing 732. This may also prevent the first sealing member 750 from sealingly engaging the housing 732. This may indicate to a user that the orientation is incorrect and, consequently, the user may rotate the housing 732 relative to the cartridge assembly 742 until the proper orientation is achieved. Additionally, or in combination, a bolt pattern to fasten the cover 734 to the housing 732 may be designed such that respective holes are in register in a single relative orientation of the cover 734 relative to the housing 732.

As shown in FIGS. 16-17, when the cover 734 is secured to the filter cartridge 736 in the correct orientation, and when the cartridge assembly 742 is received into the housing 732 in the correct orientation, a space between the two webs 734w is aligned with the outlet 732o of the housing 732. This may minimize pressure drops of the oil flowing through the filter assembly 730 since the oil may flow substantially uninterrupted from the inner passage 736a of the filtering medium to the outlet 732o of the housing 732. The spacing is therefore circumferentially aligned with the location L1, to face the outlet 732o, where the radial dimensions of both the flange 736c of the filter cartridge 736 and of the shoulder 732s between the upper section 732u and lower section 732l of the housing 732 are maximal.

Referring now to FIGS. 20-21, steps of assembling the filter assembly 730 are shown. As illustrated in FIG. 20, the cover 734 is attached to the filter cartridge 736 by first rotating the cover 734 relative to the filter cartridge 736 until the legs 734l are aligned with the slots 736s in the proper orientation. Then, the cover 734 may be translated relative to the filter cartridge 736 along direction D1 to insert the legs 734l into the slots 736s. The direction D1 is substantially transverse to the longitudinal axis L. In FIG. 21, the cartridge assembly 742 is moved relative to housing 732 along direction D2, which is substantially parallel to the longitudinal axis L, to insert the filtering medium of the filter cartridge 736 into the housing 732. The cartridge assembly 742 may be rotated relative to the housing 732 about the longitudinal axis L until the spacing between the legs 734l faces the outlet 732o, and until the location L1 where the radial dimension of the flange 736c of the filter cartridge 736 is maximum is substantially circumferentially aligned with the outlet 732o of the housing 732. The cartridge assembly 742 is moved relative to the housing 732 until the flange 734g of the cover 734 abuts the flange 732g of the housing 732 as explained above and until the sealing engagement between the filter cartridge 736 and the housing 732 is created. This results in the sealing engagement between the cover 734 and the housing 732. At which point, the cover 734 may be fastened to the housing 732 using the bores 734d defined through the annular flange 734g of the cover 734. The first and second sealing members 750, 752 are therefore biased, radially in the embodiment shown, to provide the required sealing engagement.

The disclosed filter assembly 730 may provide protection against contaminants, ease maintenance by removing the filter with the filter cover, minimize risks of disassembly in operation or mis-assembly that might lead to improper sealing between inlet and outlet. The filter legs may prevent the second sealing member 752 from disengaging and may allow to disassemble it with the cover. The legs may also locate the filter angularly and prevent the filter to be assembled before the cover. The stoppers on the filter and cover further limit the angular position.

In an alternate embodiment, the filter cartridge may be installed in the housing 732 without pre-assembling the cover to the filter cartridge. The cover may therefore be used to axially lock a position of the filter cartridge relative to the housing to maintain a sealing engagement between the second sealing member 752 and the housing 732.

As part of the regular scheduled maintenance of an aircraft turbine engine, the lubricant/fuel filters may have to be replaced. It may be important that the filters are easily accessible as this may minimize the risk of introducing debris into the engine. On a twin engine application, the filter may have to be accessible from both sides of the engine. The disclosed filter assembly may minimize the risk of disassembly or mis-assembly that may lead to improper sealing between the inlet and outlet.

In some cases, filter upright position may be the most desirable one. The outlet may need to be protected against falling debris and filter contaminants. There may be an interest to ease the maintenance by removing the filter with the filter cover. The disclosed filter assemblies may be able to hide the outlet of the filter into the filter cover; ensure a connection to the engine that may not expose the outlet; and ensure a sub-assembly (e.g., cartridge assembly 42) between the filter cartridge and the filter cover that may be required by design to assemble the sub-assembly in the filter housing. These may be achieved by a stepped housing 32; a filter assembly sequence that may include an axial seal and a keyway shape interface; and/or filter guiding features.

A stepped filter housing may allow a filter to be mounted vertically upwards. The cover may transfer the fluid to a horizontal connection located on the outlet bore further from the filter bore. This recess may allow the connection to be protected against the filter contaminants in case contaminants are scraped on the filter housing bore during maintenance. The horizontal orientation may minimize the possibility of introducing dirt back into the engine. This step may be achieved by two concentric or non-concentric bores, or by a stepped bore of different shape. If the filter is mounted near the top of the engine it may be equally accessible from both sides of the engine.

The filter assembly sequence may ensure a minimized disassembly or mis-assembly risk when installed in the housing while allowing to remove the filter with the filter cover. The filter may feature a keyway-shaped flange and an axial seal. The filter cover may feature a keyway-shape slot and a groove. To assemble, the keyway-shaped flange and groove may be aligned and engaged. The filter may slide transversely to apply an axial load on the seal and to fix the filter on the filter cover. The assembly sequence may ensure the axial seal is loaded and the sub-assembly can only be assembled in the housing if the second step is completed.

The filter guiding features may ensure the filter is properly assembled and sealed on the filter cover when finally assembled in the housing. If the guiding features are located at the bottom of the filter, they may ensure the filter remains concentric to the filter bore in order to reduce the risk of scraping the contaminant from the filter to the housing outlet when the filter is being removed.

The stepped housing bore may allow for additional radial space to slide the filter on the cover. The filter guiding feature may ensure the filter remains assembled after final assembly when used with a face seal.

The disclosed filter assemblies and cartridge assemblies may ease maintainability since securing the outlet from debris may allow to use an upright positioned filter. This may be preferable from a maintenance perspective since the bolts and filter may be directly visible/accessible from the top facilitating their access from both sides of the engine. The disclosed filter assemblies and cartridge assemblies may ease packaging since they may minimize the overall envelope required in the nacelle when mounted near the top and when the nacelle door is located at the top. The disclosed filter assemblies and cartridge assemblies may ease maintenance since they allow to remove the filter with the filter cover which may avoid the use of standard or special tooling to remove the filter.

The embodiments described in this document provide non-limiting examples of possible implementations of the present technology. Upon review of the present disclosure, a person of ordinary skill in the art will recognize that changes may be made to the embodiments described herein without departing from the scope of the present technology. For instance, it is understood that the disclosed filter assemblies and cartridge assemblies may be oriented in different orientations such as horizontally, vertically, or at any intermediate angle. Yet further modifications could be implemented by a person of ordinary skill in the art in view of the present disclosure, which modifications would be within the scope of the present technology.

The invention claimed is:

1. A filter assembly for an engine, comprising:
a housing having a longitudinal axis and defining an internal volume, the housing having an open end, the housing defining an oil inlet and an oil outlet, the internal volume having a first zone and a second zone, the first zone in fluid communication with the oil inlet, the second zone in fluid communication with the oil outlet;
a cartridge assembly having a filter cartridge extending into the internal volume, and a cover sealingly engageable to the housing to close the open end of the housing, the filter cartridge axially locked in the housing by the cover, the cover removably securable to the housing to allow replacement of the filter cartridge via the open end, the filter cartridge removably securable to the cover via a locking engagement between the cover and the filter cartridge to axially lock the cover to the filter cartridge; and
a sealing member between the housing and the cartridge assembly, the sealing member separating the first zone from the second zone such that the first zone communicates with the second zone through the filter cartridge.

2. The filter assembly of claim 1, wherein the filter cartridge includes an annular flange extending circumferentially around a filtering medium of the filter cartridge, the sealing member located between the annular flange and the housing.

3. The filter assembly of claim 2, wherein a distal end of the annular flange defines a groove, the sealing member received within the groove and biased against the housing.

4. The filter assembly of claim 2, wherein the annular flange and the filtering medium of the filter cartridge are non-concentric.

5. The filter assembly of claim 4, wherein a radial dimension of the annular flange relative to the longitudinal axis is maximal at a circumferential location relative to the longitudinal axis, the circumferential location registering with the oil outlet of the housing.

6. The filter assembly of claim 5, wherein the housing has a first housing section and a second housing section protruding axially from the first housing section, the second housing section ending at the open end, a first diameter of the first housing section less than a second diameter of the second housing section to define a shoulder between the first housing section and the second housing section.

7. The filter assembly of claim 6, wherein the first housing section and the second housing section are non-concentric, a radial dimension of the shoulder is maximal at the circumferential location.

8. The filter assembly of claim 1, wherein the locking engagement is defined by a cooperation of a leg slidingly receivable within a slot, the leg defined by one of the cover and the filter cartridge, the slot defined by the other of the cover and the filter cartridge.

9. The filter assembly of claim 8, wherein the leg is movable within the slot along a direction normal to the longitudinal axis of the housing.

10. The filter assembly of claim 8, wherein the slot and the leg includes two slots and two legs parallel to each other, each of the two slots slidingly engageable within a respective one of the two slots.

11. The filter assembly of claim 10, wherein the two legs are located at distal ends of two webs protruding from the one of the cover and the filter cartridge along an axial direction relative to the longitudinal axis, the two legs being transverse to the two webs.

12. The filter assembly of claim 11, wherein the two slots are defined by two protrusions extending axially from the other of the cover and the filter cartridge relative to the longitudinal axis, and wherein the two legs extend transversally from the two webs in a direction normal to the longitudinal axis and away form one another, the two slots facing one another.

13. The filter assembly of claim 8, comprising a first stopper at an end of the slot and a second stopper at an end of the leg such that the cover is securable to the filter cartridge in a single circumferential orientation of the cover relative to the filter cartridge.

14. The filter assembly of claim 13, wherein the filter cartridge includes an annular flange extending circumferentially around a filtering medium of the filter cartridge, the sealing member located between the annular flange and the housing, wherein the annular flange and the filtering medium are non-concentric.

15. The filter assembly of claim 14, wherein the housing has two non-concentric sections of different diameters thereby defining a shoulder at an intersection between the two non-concentric sections, the cartridge assembly securable to the housing in a single circumferential orientation one relative to the other.

16. The filter assembly of claim 15, wherein the slot and the leg includes two slots and two legs parallel to each other, each of the two legs slidingly engageable within a respective one of the two slots, a spacing defined between the two legs, the spacing oriented toward the oil outlet of the housing when the cartridge assembly is received in the housing at the single circumferential orientation.

17. A filter cartridge for a filter cartridge assembly of an engine, the cartridge assembly including the filter cartridge and a cover, the filter cartridge comprising:
a filtering medium extending along a longitudinal axis;
an annular flange radially protruding from the filtering medium relative to the longitudinal axis, the annular flange extending circumferentially around the longitudinal axis, the annular flange defining a groove at a distal end of the annular flange relative to a radial distance from the longitudinal axis, the groove sized for receiving a sealing member in the groove; and
a protrusion extending axially from the filtering medium relative to the longitudinal axis, the protrusion defining one of a leg and a slot sized to receive a correspondingly shaped element of the cover of the cartridge assembly, the one of the leg and the slot defining an abutment face facing an axial direction relative to the longitudinal axis and oriented towards the filtering medium, the abutment face configured for abutting the correspondingly shaped element of the cover to axially lock the filtering medium to the cover.

18. The filter cartridge of claim 17, wherein the filtering medium and the annular flange are non-concentric.

19. The filter cartridge of claim 17, wherein the filtering medium defines a central passage communicating with a space defined between two protrusions of the protrusion, the space registering with a circumferential location where a radial dimension of the annular flange is maximal.

\* \* \* \* \*